(12) United States Patent
Scholte et al.

(10) Patent No.: US 8,701,491 B2
(45) Date of Patent: Apr. 22, 2014

(54) ACOUSTIC HOLOGRAPHY

(75) Inventors: Rick Scholte, Eindhoven (NL); Ines Lopez Arteaga, Eindhoven (NL)

(73) Assignees: Stichting voor de Technische Wetenschapen, Utrecht (NL); Technische Universiteit Eindhoven, Eindhoven (NL)

( * ) Notice: Subject to any disclaimer, the term of this patent is extended or adjusted under 35 U.S.C. 154(b) by 537 days.

(21) Appl. No.: 12/989,463

(22) PCT Filed: Apr. 22, 2009

(86) PCT No.: PCT/EP2009/054818
§ 371 (c)(1),
(2), (4) Date: Feb. 9, 2011

(87) PCT Pub. No.: WO2009/130243
PCT Pub. Date: Oct. 29, 2009

(65) Prior Publication Data
US 2011/0120222 A1     May 26, 2011

(30) Foreign Application Priority Data

Apr. 25, 2008 (EP) .................................. 08155162
May 23, 2008 (EP) .................................. 08156850

(51) Int. Cl.
G03H 3/00 (2006.01)
(52) U.S. Cl.
USPC .............................................. 73/603; 73/643
(58) Field of Classification Search
USPC .................................... 73/603, 596, 643, 656
See application file for complete search history.

(56) References Cited

U.S. PATENT DOCUMENTS

| | | | | |
|---|---|---|---|---|
| 7,665,364 B2 * | 2/2010 | Su et al. | ........................... | 73/643 |
| 7,798,001 B2 * | 9/2010 | Shekhawat et al. | ............. | 73/603 |
| 8,316,713 B2 * | 11/2012 | Shekhawat et al. | ............. | 73/603 |
| 8,371,172 B2 * | 2/2013 | Kwon | ............................ | 73/603 |

FOREIGN PATENT DOCUMENTS

| | | |
|---|---|---|
| JP | 62-080576 | 4/1987 |
| JP | 62-247391 | 10/1987 |
| JP | 63-091684 | 4/1988 |
| JP | 63-208082 | 8/1988 |
| WO | 01/67451 A1 | 9/2001 |

OTHER PUBLICATIONS

International Search Report and Written Opinion mailed Oct. 28, 2009 (20 pages total).
Yoh-Han Pao et al., "ARMA Processing for Ultrasonic Reconstructive Imaging", Department of Electrical Engineering and Applied Physics, Case Western Reserve University, Cleveland, OH, *Ultrasonic Symposium*, 1982 (pp. 691-695).

(Continued)

*Primary Examiner* — J M Saint Surin
(74) *Attorney, Agent, or Firm* — Nixon & Vanderhye P.C.

(57) ABSTRACT

A method of performing near-field acoustic holography comprises the following steps. Establishing (102) acoustic data representing a set of near-field acoustic holography measurements at a first set of positions. Extrapolating (204) acoustic data using a model-based extrapolation to obtain extrapolated acoustic data relating to a plurality of positions outside the aperture. Applying (108) a spatial frequency transform to the padded acoustic data to obtain data in a spatial frequency domain. Propagating (110) the Fourier transformed acoustic data. Applying (112) a regularization in a wavenumber domain. Performing (114) an inverse spatial frequency transform.

22 Claims, 13 Drawing Sheets

(56) References Cited

OTHER PUBLICATIONS

Rick Scholte et al., "Regularization in PNAH by means of L-curve", Technische Universiteit Eindhoven, Dynamics and Control Technology, Eindhoven, Netherlands, *Forum Acusticum,* Budapest 2005 (5 pages).
International Preliminary Report on Patentability, Oct. 26, 2010.
Saijyou, "Regularization method for the application of K-space data extrapolation to near-field acoustical holography," Journal of the Acoustical Society of America, vol. 116, No. 1, 2004, pp. 396-404.
Maynard et al, "Nearfield acoustic holography: I. Theory of generalized holography and the development of NAH," Journal of the Acoustical Society of America, vol. 78, No. 4, 1985, pp. 1395-1413.
Bono et al, "Comparison of Nearfield Acoustic Holography and Dual Microphone Intensity Measurements," XP-002539088, 1996.
International Conference on Noise & Vibration Engineering, ISMA Conference, XP-002539088, pp. 1-13.
International Conference on Noise & Vibration Engineering, ISMA Conference, XP-002539088, pp. 1-13, Sep. 18, 1996.
Saijyou et al., "Reduction methods of the reconstruction error for large-scale implementation of near-field acoustical holographya", *Journal of the Acoustical Society of America,* vol. 110, No. 4, Oct. 1, 2001, pp. 2007-2023.
Schuurbiers, "Aliasing in PNAH", *Eindhoven University,* Jun. 2005, 44 pages.
International Search Report for PCT/EP2009/054818, dated Nov. 10, 2009.
Written Opinion for PCT/EP2009/054818, dated Nov. 10, 2009.

\* cited by examiner

US 8,701,491 B2

ACOUSTIC HOLOGRAPHY

This application is the U.S. national phase of International Application No. PCT/EP2009/054818 filed 22 Apr. 2009 which designated the U.S. and claims priority to EP Patent Application Nos. 08155162.4 filed 25 Apr. 2008 and 08156850.3 filed 23 May 2008, the entire contents of each of which are hereby incorporated by reference.

FIELD OF THE INVENTION

The invention relates to holography, more particularly to near-field acoustic holography.

BACKGROUND OF THE INVENTION

One of the ideas behind planar near-field acoustic holography (PNAH) is to determine an inverse solution of the wave equation by only making use of planar acoustic information at a certain distance from the source of interest. In fact, hologram originated from the Greek word "holos", meaning "whole", and "gramma", meaning "message". In short, the hologram may contain all information of the acoustic source. However, this information may be hidden in the hologram, and data processing may be necessary to reconstruct information about the acoustic source.

In the mid 1980s the PNAH theory was first introduced. A regularization method was described in "Regularization in PNAH by means of L-curve", by R. Scholte et al., in Proceedings of Forum Acusticum 2005, Budapest, Hungary. Some of the principles from the mentioned theory will be presented below.

A boundary condition which may be imposed in the application of PNAH is the absence of acoustic sources between the measurement plane (hologram) at $z=z_h$ and the reconstruction (source) plane at $z=z_s$. The hologram may be built up from complex sound pressure measurements that take place in x,y-space. The complex sound pressure $p(x,y,z_h,\omega)$ is then transformed to the wavenumber domain by 2-dimensional spatial Fourier transform, $$P(k_x, k_y, z_h, \omega) = \int_{-\infty}^{\infty}\int_{-\infty}^{\infty} p(x, y, z_h, \omega)e^{-j(k_x x+k_y y)} dx dy.$$

This operation results in a 2-dimensional wavenumber spectrum where two important regions can be discriminated: the propagating and evanescent wave region. The propagating wave region is positioned around wavenumber 0, bounded by a circle with radius k (radiation circle), where k depends on the sound-frequency of interest, $$k = \frac{\omega}{c_0} \left[\frac{\text{rad}}{\text{m}}\right],$$

with $c_0$ the velocity of sound and $\omega$ the angular sound frequency. The inside region contains propagating waves, while the outside region contains evanescent or decaying waves. The decay as a function of distance for the evanescent waves is regarded exponential. The wavenumber spectrum at the hologram plane can be multiplied with the inverse of the exponential, also referred to as the propagator, resulting in the wavenumber domain at any desired distance z between source and hologram plane, $$P(k_x, k_y, z, \omega) = P(k_x, k_y, z_h, \omega)e^{-jk_z(z-z_h)}.$$

This provides the wavenumber spectrum at the distance z. From this, the spatial pressure can be determined by applying the inverse 2-dimensional Fourier transform, $$p(x, y, z, \omega) = \frac{1}{4\pi^2}\int_{-\infty}^{\infty}\int_{-\infty}^{\infty} P(k_x, k_y, z, \omega)e^{j(k_x x+k_y y)} dk_x dk_y.$$

Other propagators can be determined to transform hologram sound pressure or particle velocity to sound pressure, particle velocity and sound intensity at the source.

In practice it is difficult to continually measure the sound pressure on an infinitely wide plane. Instead, spatial sampling over a finite aperture is performed. This spatially sampled data is then fast Fourier transformed using the 2-dimensional FFT algorithm. However, the results of such algorithms are not always satisfying.

SUMMARY OF THE INVENTION

It would be advantageous to have improved near-field acoustic holography. To better address this concern, in a first aspect of the invention a method is presented that comprises establishing acoustic data representing a set of near-field acoustic holography measurements at a first set of positions covering an aperture;

extrapolating the acoustic data using model-based extrapolation to obtain extrapolated acoustic data relating to a plurality of positions outside the aperture; and applying a spatial frequency transform to the extrapolated acoustic data.

The model-based extrapolation provides an improved padding. This improved padding leads to reduced leakage during the spatial frequency transform. Aliasing and other discretization effects may also be reduced. Consequently, the resulting data in a spatial frequency domain is of a higher quality. Such resulting data may comprise more information and less artifacts. Because of this, it provides an improved basis for several data processing algorithms which may be applied in a spatial frequency domain.

The spatial frequency transform may comprise a discrete Fourier transform, a Z-transform, or a wavelet transform, for example.

By propagating the acoustic data in a spatial frequency domain and performing an inverse spatial frequency transform to the propagated data, reconstructed acoustic data may be obtained. Such reconstructed data benefits from the improved result of the spatial frequency transform. Consequently, the resulting reconstructed acoustic data is of improved quality. In particular the presence of artifacts in the reconstructed acoustic data may be reduced. The resolution may be increased.

Advantageously, the model-based extrapolation is based on a linear predictive model, because it was found to provide stable results when used for data extrapolating data in acoustic holography. Moreover, linear predictive extrapolation can be performed efficiently, and allows use of known modeling techniques such as the Burg method. However, other models may be used for the extrapolation, for example a polynomial model, spline-based model, or a model based on Lagrange basis functions.

More information may be preserved during the data processing steps, which results in a better reconstruction, by applying an anti-leakage window which leaves the originally measured data unchanged. Preferably, the anti-leakage window tapers near the outer edge of the padded area, the padded area being filled with model-based extrapolated values. This way, the information contained in values directly relating to the measured data may be preserved while still having the advantage of a tapering window.

Preferably the predictive padding is performed in such a way, that there are no sudden changes between the extrapolated values and the measured values near the edges of the aperture. This may be realized by keeping the signal value and its derivative continuous at the edges. Also, second and higher order derivatives may be continuous.

In another aspect of the invention, a regularization is applied in a spatial frequency domain by establishing at least a cut-off and a slope of a low-pass filter in dependence on a quality measure of acoustic data processed by the low-pass filter with the cut-off and the slope; and applying the low-pass filter using the cut-off and the slope to obtain regularized data. Allowing to select values of both cut-off and slope provides more freedom in selecting the regularization properties. It was found that by varying both cut-off and slope, the quality of the reconstruction may be improved considerably.

Preferably a substantially optimal value is chosen for the cut-off and slope in respect of the quality measure. The quality measure may be based on a residual error and a perturbation error.

According to an aspect of the invention, the following are provided:

a distance detector for detecting a distance to at least part of an object;

a measurement plane selector for establishing a measurement plane in dependence on the distance; and a sensor positioner for positioning an acoustic sensor on the measurement plane.

This allows to adapt the measurement plane dynamically to a shape and position of an object to be measured. Consequently, the positioning of objects to be measured is less tedious.

Further aspects of the invention are defined in the independent claims. The dependent claims define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

Figure 1:
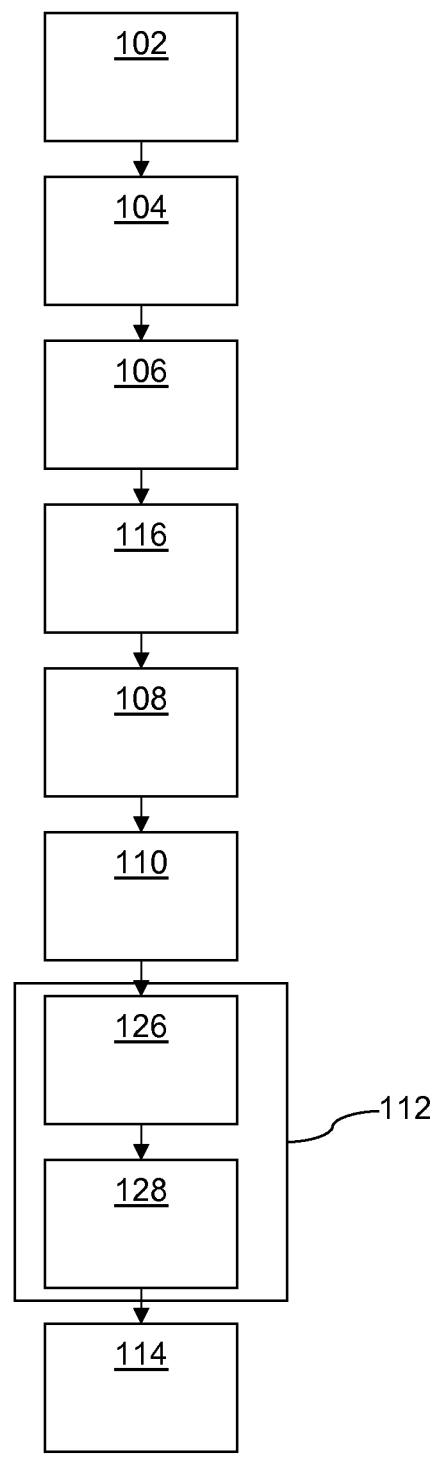
FIG. 1 illustrates processing steps of a method of acoustic holography.

In this description, aspects of automated near-field sound imaging technology will be disclosed. Some of the features explained herein help to automate the system. Some features help to improve the resolution or general quality of the reconstruction.

Automated spatial set-up (prior to measurement), applying spatial anti leakage (e.g. using linear predictive border-padding), and automated regularization (using cut-off and slope iteration) may help to automate the procedure because they can be performed without substantial interaction with an operator. Also, these techniques may improve the quality of the reconstruction. Moreover, high precision sensor placement facilitates high-resolution near-field acoustic holography (NAH).

Advanced spatial source contour identification, using a plane z=0, wherein all sound sources are assumed to be on one side of the plane, whereas the measurements are performed on another side of the plane, helps to identify the sources. This may be realized by means of a plate, for example a glass plate, to which any the sound creating objects are aligned. The plate may be removed before starting the measurements. This kind of positioning may also be performed using triangular laser measurements or ultrasonic distance measurements, for example. Using such laser or ultrasonic measurements, a contour of an object to be measured may be detected. It is possible to adjust the measurement plane to fit the contour of the object to be measured. For example, an adaptive measurement plane may be adjusted to have a preferred distance and/or orientation with respect to a contour of the object. Advantageously, the adaptive measurement plane is adjusted to have an orientation substantially parallel to a boundary of the object. An adaptive measurement plane may be realized using an acoustic sensor mounted on a robot arm, wherein the robot arm causes the sensor to traverse a plurality of positions in the adaptive measurement plane. Alternatively, an array of acoustic sensors is rotably mounted with respect to an object to be measured. Prior to performing the acoustic measurements, several distances between the sensors and the object may be measured, using laser triangulation and/or ultrasonic measurements, for example. In this respect, preferably the acoustic sensors are acoustic transducers capable of performing a reflective distance measurement. The sensor array may be rotated and/or shifted (either manually or automatically) in dependence on the measured distances. Such an adaptive measurement plane improves the efficiency. It allows the placement of objects to be more arbitrary. A glass positioning plate may not be necessary any more.

High precision visuals may be coupled to the acoustics, for example by generating a photographic or video image of the object(s) comprising the sound source(s), and accurately overlaying this photographic image with the reconstructed sound distribution in a combined visualization, increases the usability of acoustic holography systems. This may be important to draw strong conclusions with respect to the locations of any sound sources.

Reconstruction of missing or faulty measurement positions may be facilitated by means of the extrapolation model used in linear predictive border-padding, which model may also be used to interpolate missing or faulty measurement positions.

A multi source flexible clamping unit may be used to conveniently position an object containing one or more sound sources with minimal influence on the acoustic measurements.

The present disclosure offers a solution for fast, accurate and automated sound field visualization, which facilitates the localization and analysis of sound sources in existing and new products. Such a system can be operated by a non-expert in the field of acoustic measurements, although some training may be needed. Also, it is possible to perform measurements using a remotely controlled system over a network or internet environment followed by off-site analysis.

At first, the object placement with respect to the sensor array or traverse system may be fixed in order to define the absolute distance between the sensory system and the object. The orientation and exact distance of the sensory system may be used for accurate calculation of the NAH solutions. After correct placement of the object with respect to the sensors, an area of interest and required resolution of the acoustic images are selected. A built-in camera may be used to visualize the object and the desired object-area selection is used to couple visual and acoustic information in an accurate manner, in order to identify acoustic (noise) sources.

The optimal measurement distance may be determined by a mathematical relationship based on the signal-to-noise ratio on a pre-defined number of positions on the measurement grid, also referred to as hologram, and the requested resolution. After the measured plane is calculated by the system software and all grid-points are measured, linear predictive border-padding may be used to automatically extrapolate the data before the two-dimensional spatial FFT is applied. In k-space, where the inverse solution is determined, the regularization process automatically determines the proper cut-off and slope of the k-space low-pass filter, which is a compromise between blow-up of noise and elimination of source information. The resulting data is then zero-padded for optimal interpolation in the spatial domain and fit for the inverse of the two-dimensional FFT, which results in the requested source information after truncation of the zero-padded parts.

The system may be used to measure e.g. small objects like a mobile phone, large objects like a truck, and everything in between. A large variety of acoustic source information and visualization is obtainable. Examples are sound pressure, particle velocity and sound intensity in three dimensions between the source and hologram plane and also into the far-field. This allows for acoustic overlays of the source image, radiation from the source into the far-field, total radiated sound power, and so on.

A wide variety of add-ons and possibilities may be supported; the sensory system may include a combination of microphones, microflowns, lasers and/or cameras, these sensors may be operated as a single sensor or in connected arrays with multiple sensors. When either the sensory system or the object is traversed over a pre-defined grid, one or more reference sensors or signals may be used to phase match all individual points. This helps to calculate a proper NAH solution and to visualize reconstructed acoustic data over time (may also be used in movies). Circumstances in an anechoic chamber may be optimal; on the other hand, measurements outside such a room are also possible thanks to the robustness of the post-processing methods. Besides passive measures, also active (background) noise cancellation may further improve the quality of the results in acoustically hazardous environments.

Possible system configurations include: Serial single sensor, line or full-sensor array measurement over a pre-defined grid with a traverse robot and an object in a special clamping unit in or outside an anechoic room; Continuous scanning sensory system over a pre-defined grid, the hologram data is then recovered from the time data; A static or portable full array measurement with sensors able to determine the distance to the object in front of the array.

FIG. 1 illustrates processing steps in a process of performing near-field acoustic holography. Such a process may be implemented in a computerized system, for example by means of software comprising instructions which may be executed by a processor. Such a computerized system may, for example, comprise a standard personal computer as known in the art. It is also possible to integrate the functionality of the process in a dedicated near-field acoustic holography equipment device. It is also possible to offer the execution of the process as a service by means of remote application server, via a web based interface for example. The process may be initiated by a user requesting a holographic reconstruction. The process may also be initiated automatically upon receiving data, for example. It will be understood that most steps are optional.

In step 102, acoustic data is established representing a set of near-field acoustic holography measurements at a first set of positions covering an aperture. This step may involve receiving the acoustic data or acquiring it from an actual acoustic sensor system. This step may also comprise filtering an acoustic signal to obtain a complex acoustic quantity representing the acoustic signal at a particular frequency or frequency range which may be of interest to a user. This frequency or frequency range may be user configurable. This step results in acoustic data comprising a complex acoustic quantity. This step may result in data indicative of at least a property (for example a complex-valued quantity) of the acoustic signal at the first set of positions, for example the sound pressure, particle velocity, and/or sound intensity corresponding to the desired frequency or frequency range.

In step 104, the acoustic data may be extrapolated using a model-based extrapolation to obtain extrapolated acoustic data relating to a plurality of positions outside the aperture. The model-based extrapolation may comprise using a linear predictive model, which will be described in detail elsewhere in this description. Alternatively, other model-based extrapolation may be used, for example fitting of a polynomial or non-linear regression.

In step 106, the acoustic data may be padded using the values obtained by means of extrapolation. This results in padded acoustic data. The data are arranged in such a way that it appears to the spatial frequency transform (step 108) as if the acoustic measured data and the extrapolated data form a single, two-dimensional signal. For example, the extrapolated data and the measured data are combined in a single matrix, with the measured data in the middle and the extrapolated data around it. Acoustic data padded in this way is less disturbed by numeric instabilities such as leaking when applying a spatial frequency transform, for example, a discrete Fourier transform (such as the well-known fast Fourier transform (FFT)). For example, such numeric instabilities may be significantly reduced if the padded data maintains a continuous derivative at the border between aperture and padded values (for example, the difference between neighboring values does not change significantly near this border compared to other positions within the aperture). The amount of padding may be determined in part by the performance constraints of e.g. FFT transform (padding up to a power of 2 of data elements for example).

In step 108, a 2D spatial frequency transform is applied to the padded acoustic data to obtain data in a spatial frequency domain, such as a wavenumber domain k-space. This step may benefit from the model-based extrapolated padded data obtained from steps 104 and 108. The spatial frequency transform is for example a 2D Fourier transform. Other transforms are also possible.

In step 110, the transformed acoustic data may be propagated towards a second set of positions different from the first set of positions to obtain propagated data corresponding to the second set of positions. This step may involve a multiplication operation with a propagator. Propagating is discussed in more detail elsewhere in this description.

In step 112, a regularization may be applied in a wavenumber domain. This regularizes the propagated data to obtain regularized data. Such regularization may reduce the effect of any errors in the measurements on the propagated data.

In step 114, an inverse spatial frequency transform is applied to the regularized data to obtain reconstructed acoustic data representing an acoustic signal at the second set of positions. This results in a reconstruction of at least a property (for example a complex-valued quantity) of the acoustic signal at the second set of positions, for example the sound pressure, particle velocity, and/or sound intensity corresponding to the desired frequency or frequency range. The inverse spatial frequency transform is for example a 2D inverse Fourier transform, for example a 2D inverse FFT.

The resulting data of step 114 may be visualized graphically for example. To improve efficient localization of the acoustic sources, the reconstructed acoustic data may be visualized overlaid with a visual representation of an object or a scene comprising the acoustic sources being measured. The visual representation may comprise a photographic image of the object in the measurement device. Preferably the camera calibration parameters are known in relation to the first set of positions and/or second set of positions, to facilitate proper overlay of the visual and reconstructed information.

To further enhance the results of the spatial frequency transform of step 108, the padded acoustic data created in step 106 may be subject to an anti-leakage window. To preserve the available measured data during the signal processing, the window is applied in such a way that the acoustic data covered by the aperture (i.e., resulting from actual measurements rather than extrapolation) remains substantially unaltered. This may be realized by a multiplicative window function which has value 1 in the aperture range.

In step 104, the step of extrapolating may use linear predictive extrapolation. Linear predictive extrapolation has proved to provide stable results. Linear prediction may be performed as follows. A plurality of impulse response coefficients is computed using the acoustic data representing measurements at a sequence of positions. The sequence of positions corresponds for example to a row or a column of a matrix of measurement positions. These impulse response coefficients may be used to initialize a digital filter in a way known in the art. This initialized filter may be used for providing the extrapolated acoustic data relating to the plurality of positions outside the aperture.

The data may be extrapolated in four directions: for example left, right, top, bottom, according to the layout of the first set of positions. For example, the positions may be arranged in a grid, preferably a regular grid. The grid may be planar or cylindrical for example.

The measurements may be extrapolated in a first extrapolation direction (for example left) and a direction opposite to the first extrapolation direction (for example right, see FIG. 7 graph 702 for an example) to obtain first extrapolated values. Next, the measurements and the first extrapolated values may be extrapolated in a second extrapolation direction (for example top) to obtain second extrapolation values. The values may also be extrapolated in a direction opposite to the second extrapolation direction (for example bottom, see graphs 703, 704, 705 for an example), the extrapolated acoustic data comprising 2D extrapolated data representing values from both the first extrapolated values and the second extrapolated values. This way, model-based extrapolation data is provided for a full 2D padding of the measurement data, which improves results of a subsequent 2D FFT transform, for example.

Step 112, in which a regularization is performed, may involve a process of selecting appropriate cut-off and slope. This may be realized using an optimization technique. Optimization of both cut-off and slope was found to provide better regularization results than optimization of a single parameter (e.g. optimizing only cut-off or only slope). Such a process of cut-off and slope optimization may comprise a step 126 of establishing optimal values of at least a cut-off and a slope of a low-pass filter. These optimal values may be established by evaluating a quality measure based on a residual error and a perturbation error. The optimization process may be realized using a numerical non-linear optimization routine, for example. The process may also comprise a step 128 of applying the low-pass filter using the optimal values of the cut-off and the slope to obtain the regularized data.

The regularization may be improved by considering that the signal to noise ratio of propagating waves is higher than the signal to noise ratio of evanescent waves, due to exponential decay of evanescent waves. A propagating wavenumber range may be established in which propagating waves occur, and an evanescent wavenumber range may be established in which evanescent waves occur. These wavenumber ranges are known in the art. These ranges can be taken into account by using for the regularization a low-pass filter which passes substantially all of the propagating wavenumber range and which attenuates part of the evanescent wavenumber range. In particular a part of the evanescent wavenumber range having a low signal-to-noise ratio is attenuated.

Preferably, the low-pass filter comprises an all-pass range, which includes the propagating wavenumber range, an all-stop range, which comprises part of the evanescent wavenumber range, and a tapered range between the all-pass range and the all-stop range, the tapered range comprising part of the evanescent wavenumber range.

Step 102 of establishing acoustic data may comprise performing an acoustic measurement. Such a measurement may involve setting up an acoustic source in a measurement environment, setting up acoustic sensors spaced according to a particular step-size. Preferably, the setup of such a measurement uses a measurement configuration satisfying $$\sqrt{k^2 + \left(\frac{D_{max}\ln 10}{20(z_h - z_s)}\right)^2} \le 0.5 k_{sample},$$

wherein k is a wavenumber of interest, $(z_h - z_s)$ a distance between hologram and source, $k_{sample}$ is a sampling wavenumber based on an inter-sensor step-size, and $D_{max}$ is a maximum dynamical range over the hologram. This way, highly relevant data is collected which results in high resolution and/or good quality acoustic reconstruction.

Figure 2:
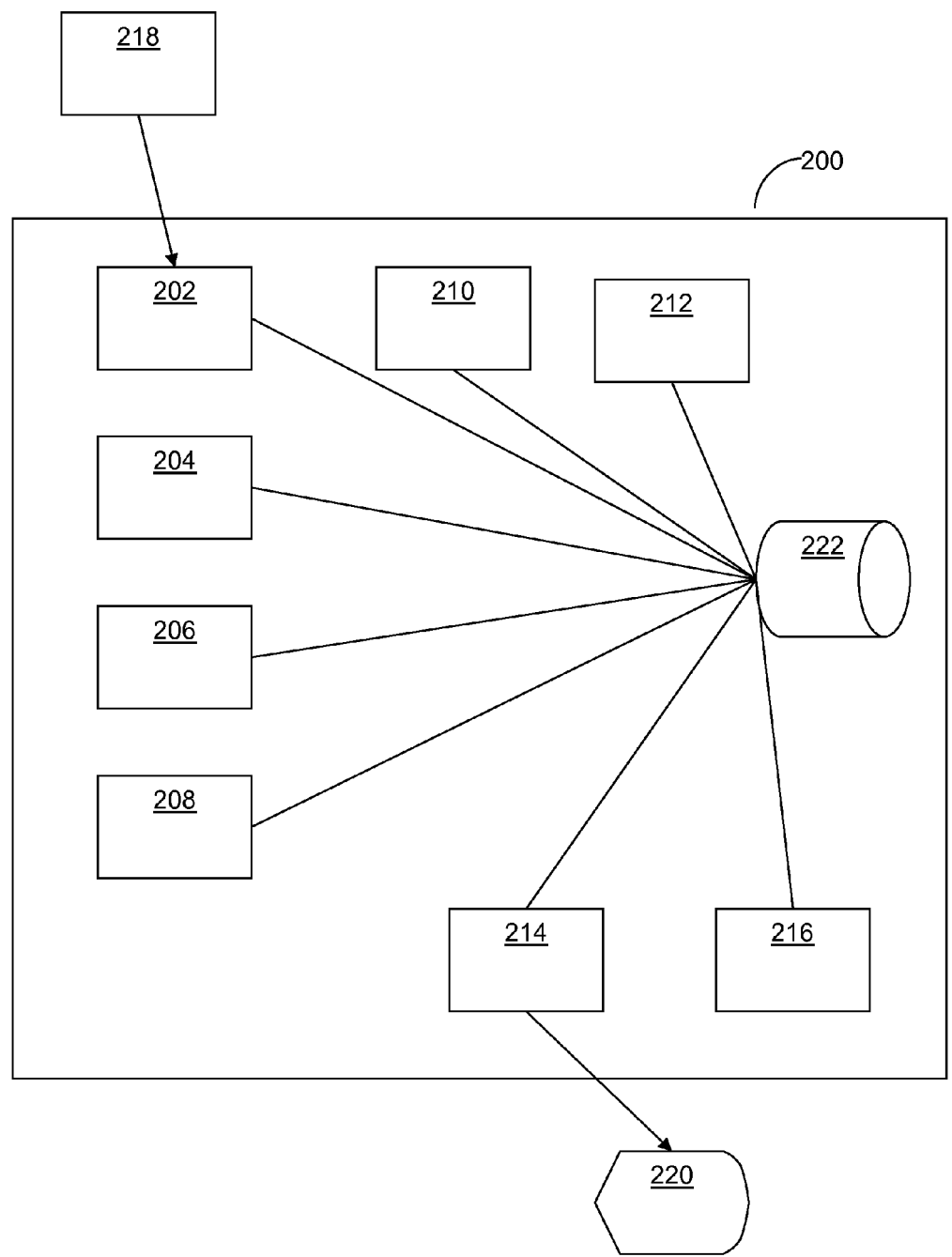
FIG. 2 illustrates a diagram of a system for acoustic holography.

FIG. 2 illustrates a system 200 for performing near-field acoustic holography. Such a system may be implemented on a computer system or as a dedicated electronic circuit, for example. The system comprises a memory 222 for storing input data, intermediate results, and final or output data. The memory 222 may comprise RAM memory and/or a hard disk, for example. Removable media and a network connection are also options to obtain or store data, also for providing data to input 202 and for storing an end result of system 200. Several modules 202-216 may have access to data stored in the memory 222; These modules may interact with each other via the memory 222. Alternatively or additionally, they may communicate via a data bus, or via a known software inter-process communication protocol, for example, to exchange data and/or control signals. The diagram of FIG. 2 only represents an example architecture. Other divisions between modules and other architectural arrangements are also possible.

A measurement setup 218 is provided for performing acoustic measurements. Data resulting from these measurements is provided to input 202. Input 202 may perform some processing on the received data to obtain a complex acoustic quantity relating to a specific frequency or frequency range, for example. The input 202 establishes acoustic data representing a set of near-field acoustic holography measurements at a first set of positions covering an aperture. This data may be stored in the memory 222.

An extrapolator 204 is provided for extrapolating the acoustic data using a model-based extrapolation to obtain extrapolated acoustic data relating to a plurality of positions outside the aperture. A data padder 206 is provided for padding the acoustic data using the extrapolated acoustic data to obtain padded acoustic data. A spatial frequency transformer (208) is provided for applying a spatial frequency transform to the padded acoustic data to obtain Fourier transformed data. A propagator 210 is provided for propagating the Fourier transformed acoustic data towards a second set of positions different from the first set of positions to obtain propagated data corresponding to the second set of positions. A regularizer (212) is provided for applying a regularization in a wavenumber domain to the propagated data to obtain regularized data. Also, an inverse spatial frequency transformer 214 is provided for performing an inverse spatial frequency transform to the regularized data to obtain reconstructed acoustic data representing an acoustic signal at the second set of positions.

Figure 3:
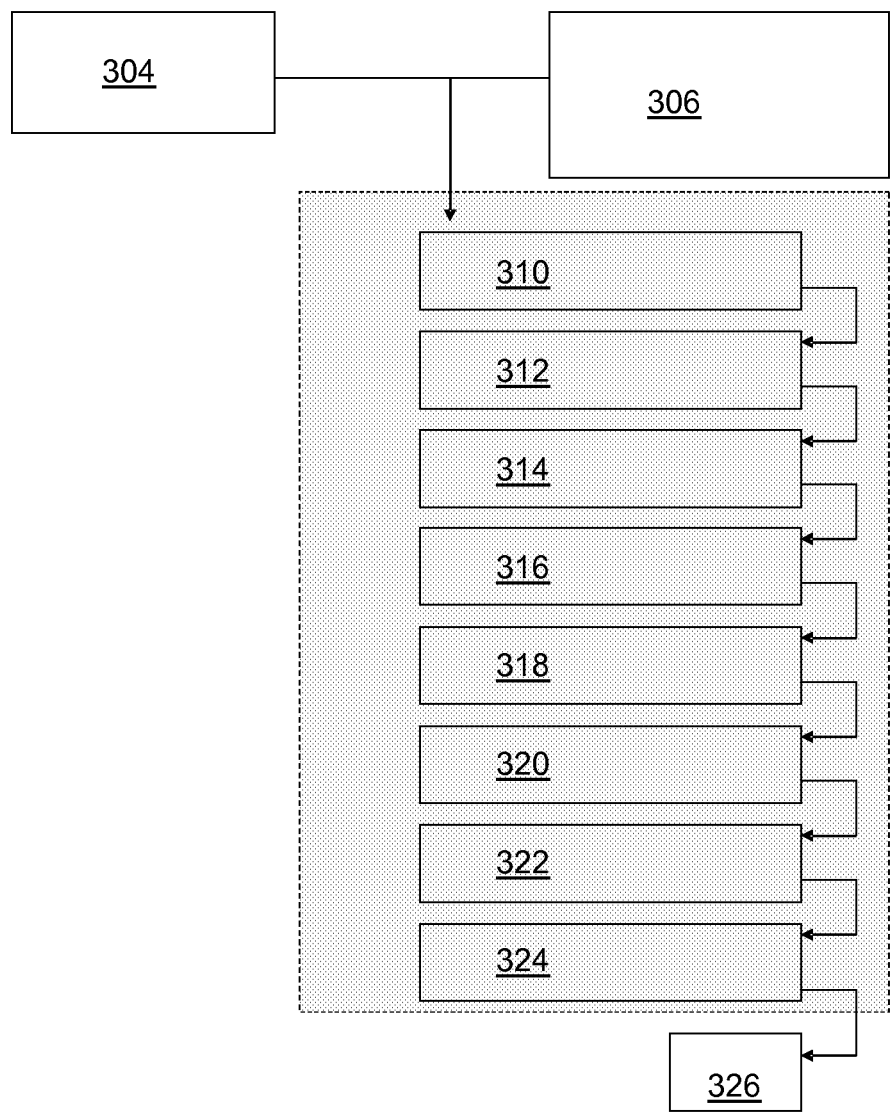
FIG. 3 illustrates a diagram of a method of acoustic holography.

FIG. 3 illustrates an embodiment. Box 302 indicates processing steps which may preferably be automated.

Step 304 involves placement of the object of interest in front of the sensor system and definition of the absolute area in between sensor(s) and source. For small objects this means placement in the system's clamping unit, large objects are placed in front of the system and scanned with a distance measuring device (for example a laser or ultrasonic device). The clamping unit is fixed to the traverse unit of the measuring device that holds the acoustic sensory, by using a framework in which the object is clamped the system "knows" where the object is located. This creates a space where the traverse system operates and the post-processing software calculates; the exact location is known, so the optical camera is used to automatically determine the scanned visuals and the acoustic measured and processed data (inverse solution, etc.) on top of the image. In step 306, the desired resolution, frequency band, and output format are defined.

In step 310, a hologram (measurement) distance is determined through an automatic process that provides an estimation of the signal-to-noise ratio (SNR) of the measurement. Based on this SNR figure and the requested resolution by the user, an optimal hologram distance is calculated. The traverse system is automatically instructed to measure at this distance.

In step 312, a traverse system automatically moves the sensor(s) over the desired measurement area. The traverse system is constructed in such a way that it minimizes acoustic reflections, minimizes changes of acoustic impedance, etc. It is able to hold any type of sensor setting, for example single-point sensors, line arrays and full arrays of sensors. The resolution of the acoustic imaging system is highly dependent on the step-size of the traverse system and its accuracy. The sensory system may comprise acoustic sensors combined with optical sensors. The acoustic sensors include for example a microphone for sound pressure or a micro flown for particle velocity measurements. The optical sensors are used to obtain a picture of the object of interest in order to couple acoustic radiation and sources to the visuals of the object. A CCD camera and a laser are able to provide this information.

In step 314 standard data-acquisition is used to properly transform all measured data into the digital domain (including anti-aliasing, A/D-conversion, FFT, etc.). After the traverse system finished sampling all grid or hologram positions the resulting complex holograms are stored digitally.

In step 316, linear predictive border-padding, which will be explained hereinafter in more detail, may be used to properly extrapolate the spatial data of the holograms in order to correctly transform into the wave-number domain where the inverse solution of NAH is determined. Linear predictive border-padding also enables the possibility to automatically drop out faulty measurement points and determine an optimal replacement based on surrounding data points. Besides that, various planes with multiple spatial sampling rates are combined and missing areas are filled by means of border-padding. Lastly, border-padding makes NAH processing of sparse arrays practical and accurate, because the array data is extrapolated optimally based on known data and the process is extremely fast due to the use of FFT based methods. This method may also be used for real-time near-field sound imaging with hand-held and static arrays.

In step 318, the inverse solution is carried out in the wave-number domain or k-space, as explained elsewhere in this description. This type of inverse solution is useful for accurate and very fast determination of the relevant information.

In step 320, regularization is automatically carried out in k-space by means of Cut-Off and Slope (COS) iteration or comparable methods, wherein the filter parameters may be determined without the need for extra information provided by the system operator.

In step 322, inverse two-dimensional FFT is performed. In step 324, the resulting spatial aperture may be truncated, since the extrapolated parts introduced with the border-padding procedure are still intact. In step 326, the resulting reconstructed sound information may be stored or displayed, optionally combined with the visual information.

Figure 4:
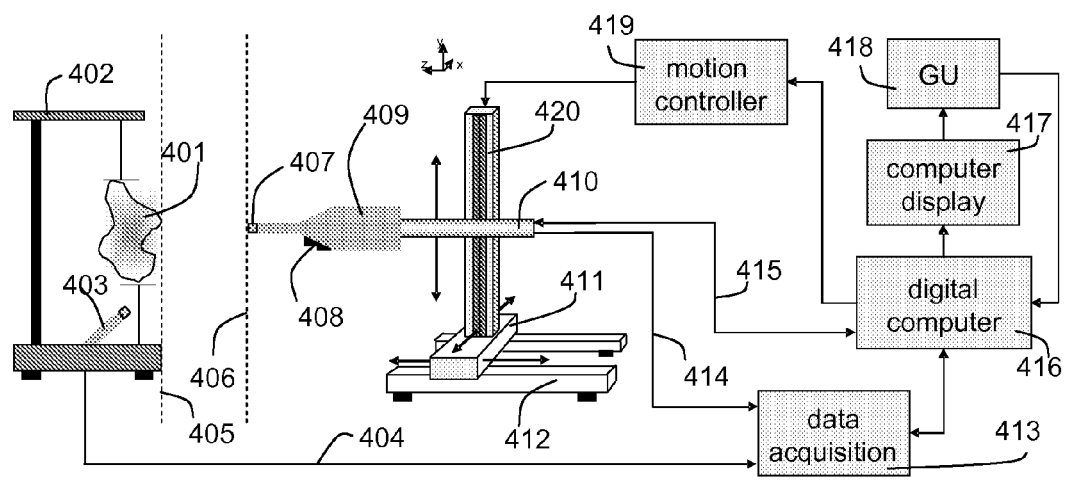
FIG. 4 illustrates a single sensor unbounded resolution system.

FIG. 4 illustrates a single sensor unbounded resolution system. Such a system often operates in an anechoic chamber for best results. However, due to the robustness of the system, measurements outside this room are also possible.

In the object area 401 of the clamping unit 402 an object of arbitrary size (given a large enough clamping unit) is placed. The clamping unit is specifically designed to fixate every sound emitting part of the object behind the source plane 405 in order to fulfill the boundary conditions of the NAH method. The sensor body 409, which holds (in this case) a microphone 407 and a miniature CCD camera 408, is attached to a robot arm 410 connected to the y-axis 420 of the traverse system/robot that is able to move up and down. This construction is mounted on the x-axis of the traverse robot 411, which moves the system backward and forward in the x-direction, parallel to the hologram plane. The x-axis is placed upon the z-axis, which moves the complete system in the z-direction, perpendicular to the hologram plane.

The traverse robot is controlled by the software package in the computer 416 and a motion control unit 419. The positioning algorithms are implemented in the software that controls motion and measurement simultaneously. The grid-size, desired spatial resolution and frequency band of interest are inserted by the user through interaction with the graphical user interface 418. Based on this information and noise conditions, the system automatically determines the optimal distance of the hologram plane 406 parallel to the source plane 405 and calculates the positions the traverse robot moves the sensor 407 to in order to collect the required hologram data. For example use is made of the above mentioned formula $$\sqrt{k^2 + \left(\frac{D_{max}\ln 10}{20(z_h - z_s)}\right)^2} \leq 0.5 k_{sample}.$$

The traverse robot may be arranged for traversing within an adaptive measurement plane, as set forth in the foregoing.

At a single hologram or grid position the software in the computer 416 collects sound pressure from the microphone in the grid 407, image information from the camera 408 and reference information from 404, in this case a microphone mounted on the clamping unit 403. The pressure signals are amplified and digitalized by the data-acquisition hardware 413, which communicates the measured data to the computer 416. The computer also collects the image data through a wire connection 415 and the system software processes all data as described earlier; results are displayed on the computer screen 417 and editable by interaction with the GUI 418.

Figure 5:
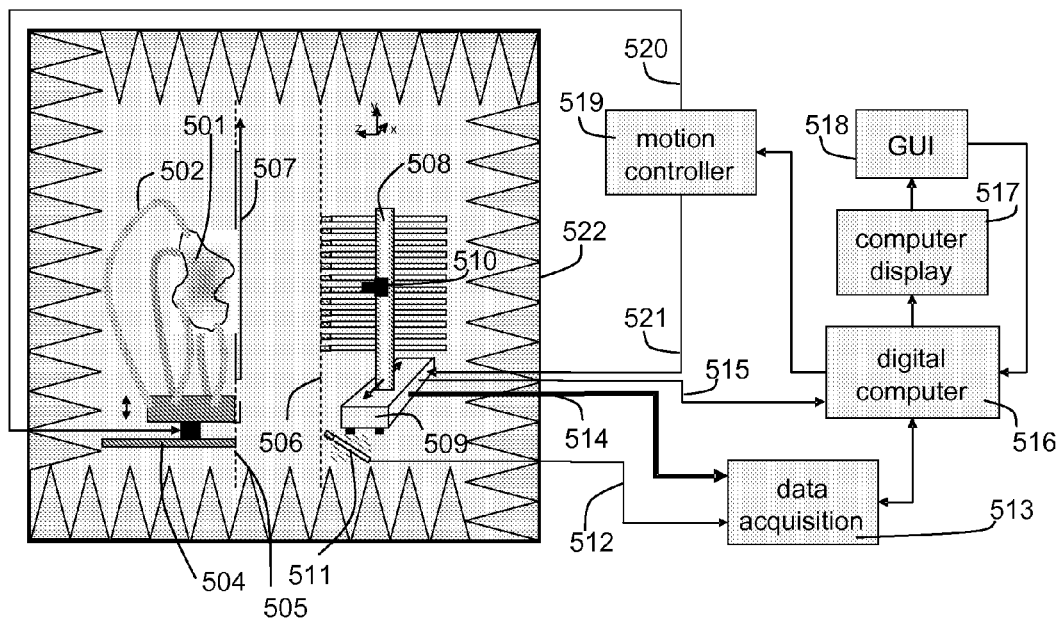
FIG. 5 illustrates a portable line-array system.

FIG. 5 illustrates a portable line-array system for small objects. This system is comparable to the primary embodiment with a small number of significant changes. First of all, this embodiment is portable and focused on smaller objects (~20 cm$^3$) for a frequency range between 600 Hz and 20 kHz. The system is placed in a small anechoic box 522 and generally uses an array of sensors instead of a single sensor. This system is easily placed in a small laboratory or a production facility where smaller objects are produced or investigated that require high resolution source identification.

The object of interest 501 is placed in a flexible clamping unit 502 that holds a number of octopus arms capable of grabbing the object. The object is placed behind a glass plate 507 that coincides with the source plane 505, after fixation of the octopus arms 502 the glass plate is removed. The distance between source 505 and hologram plane 506 is now defined and is only changed by moving the clamping unit base 504 backward and forward. The sensor line-array 508 with microphones placed in vertical direction is mounted on a traverse system 509 that moves in the x-direction, parallel to the hologram plane 506. The CCD camera 510 mounted on the line-array 508 is used to capture the image of the measured object. The clamping unit 502 is moved in vertical direction with respect to the base 504, parallel to the source plane. To capture the correct phase as the array moves to different hologram positions a reference signal is measured from the static microphone 511 mounted in the box.

The measurement and processing procedure is similar to the system described as the primary embodiment, only the motion control is different. The motion controller 519 moves the line-array 508 over the x-axis 509 to collect all grid measurements in a single row of the hologram. To access the next row the motion controller operates the clamping unit 502 up or down through 520, again a complete row is covered by controlling the x-axis movement as described.

Figure 6:
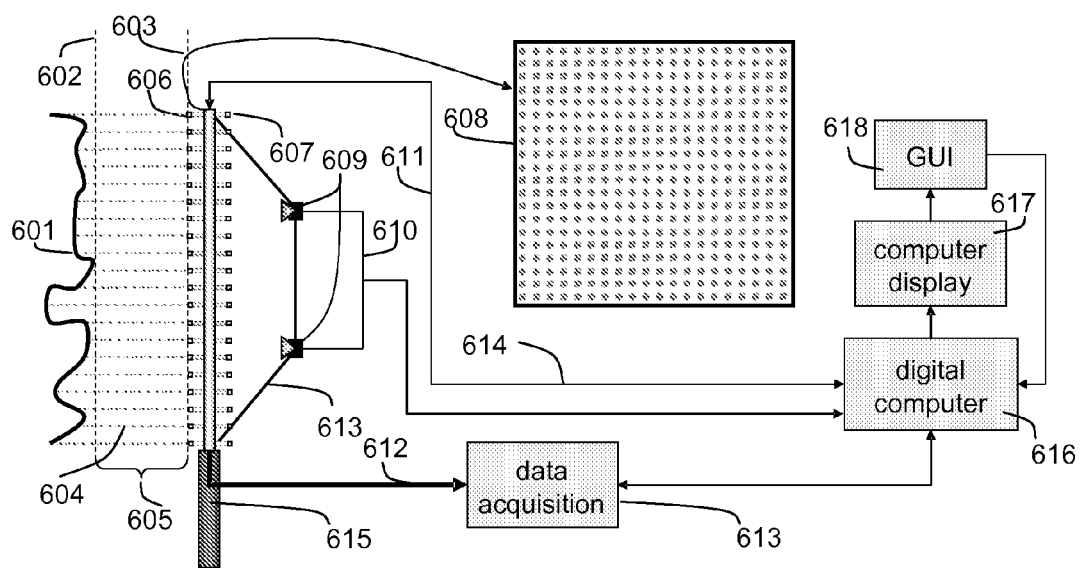
FIG. 6 illustrates a portable double-layered array.

FIG. 6 illustrates a portable double-layered array, which may be suitable for use in acoustically hazardous areas. The portable double-layered array is a hand-held array that is possibly used in acoustically hazardous areas, like a factory hall or interior of an automobile.

This full array is positioned by hand 615 or placed in a stand or on a traverse system. The full array 608 is positioned in front of a sound emitting structure 601. The hologram distance 605 is determined by an ultrasonic system or by a laser triangulation system implemented in the array 608. The source plane 602 is defined by a part of the object which is closest to the array and parallel to the hologram plane 603. Again, the source-free area between source and sensors is defined and a measurement is conducted.

The measurement of the double-layered array is carried out through parallel channels 612 by the multi-channel data acquisition system 613. The necessary source image data is collected 610 by a stereo view camera combination 609, which is used to filter out the sensors that block the visual source image. NAH data-processing is conducted equally to the primary embodiments. However, obtaining the correct holograms for the desired frequencies is different. The back layer of sensors 607 combined with the front layer of sensors 606 is used to differentiate between sound originating from the front and the back. Subsequently, the signals from the back of the array are subtracted from the signals originating from the front (source) of the array, thus the desired hologram is obtained.

This type of set-up potentially supports real-time NAH, because of the extremely fast data-processing algorithms. In all embodiments, but particularly useful in this system, the use of wireless data collection improves handling and flexibility. Communication through connections 610, 611, 612, and 614 then become wireless.

An embodiment comprises a single sensor or line-array fast/quick-scan. A quick or fast scan is a method that uses a set-up similar to the one shown in FIG. 4 or FIG. 5, for example. It may be used to conduct a quick sweep of the hologram plane by moving the sensors over a pre-defined grid without interrupting stops before the whole area is scanned. This is another way to obtain the required hologram information for the NAH system, which is aimed on measurement speed. This allows to identify a sound source in a relatively short time. The sensor trajectory may be carefully collected and exactly matched to the measured data during the movement; this involves coupling of time and place.

In the following, an example use is presented. A company for small electronic equipment with separate research and production facilities, may place a system with clamping unit in a small anechoic case (similar to FIG. 4) on both sites. In the development stages the research engineers operate the system to assist from scratch to prototype. The automatically generated acoustic source images are easily edited in the graphical user interface of the post-processing software. Also, all individual steps of the full process are logged, which supports completely transparent editing and reviewing.

The development may be switched to the production facility where the development is continued. The research engineers now operate the system by logging into the system network interface, which allows them to use the interface through an internet browser. They exercise full control of the system, while the technical engineers at the production facility only need to place the object of interest in the clamping unit. The system is remotely controlled and observed over a large distance and results are post-processed at the research facility.

A second system with a full array may be inserted into the production line for quality control, where every produced product (or a selection of produced products) may be automatically measured and quickly processed without significantly slowing down the production pace. All sound specifications (or a selection of sound specifications) may be checked; when a product is disapproved the product is taken out and the engineers are able to check the sound images. Besides taking countermeasures to meet the specifications, a complementary higher resolution measurement is an option to zoom in on the problem area.

By application and integration of sound imaging technology into their research and production facilities, this company is able to reduce their time-to-market of newly developed products, and also automatically quality control on all produced products to meet the sound specifications.

A process of near-field acoustic holography may be outlined as follows. First, a plurality of audio signals is received for each measurement point. Each audio signal may be filtered individually to obtain, for each measurement point, a signal in a user-defined frequency band (for example wide or narrow-band). This filtering may involve FFT, and selecting the value of the FFT at particular frequencies of interest. However, processing the complete band is also an option. This results in a complex acoustic quantity (for example either sound pressure or acoustic particle velocity or combinations of both) of the signal at that frequency and spatial location, i.e., p(x,y,z,ω) may mean the amplitude and phase of a signal component of angular frequency w at point (x,y,z) which makes the values p(x,y,z, ω) complex. All the points combined result in a spatial distribution of points which is referred to as an acoustic hologram.

The sparse spatial hologram data may be padded in order to make a good transition into the wavenumber domain or k-space later on. Zero padding or border padding are techniques which are known in the art and which may be used, for example. However, padding based on model-based extrapolation is preferred. For example, linear predictive padding (also referred to as linear predictive border padding) may be used. Such linear predictive padding may be performed as follows. Estimate an impulse response of a row (or column) of data. Sequentially establish an extrapolated row value based on the prior row values (re-using extrapolated values to extrapolate further points), using the impulse response and the signal itself in a linear prediction filter (the used model is based on the impulse response). Perform the extrapolation into both directions of the row (to the 'left' and to the 'right'). Perform these steps also on the columns (both original columns and extrapolated columns). Of course, rows and columns can also be processed in reverse order (first columns, then rows).

An anti-leakage window may be applied to the border padded data. Preferably a Tukey window, which leaves original measurements unaffected if applied in the way described elsewhere in this description, is applied. A spatial (2D) FFT transform of the complex acoustic quantity into the wavenumber domain or k-space is performed.

The data thus obtained, which may be represented in matrix form, is multiplied with a (inverse) propagation matrix, which may contain an $\exp(j\ k_z(z-z_h))$ term and a constant depending on the quantity transform required (pressure to pressure, pressure to particle velocity, etc.), to obtain a Fourier transformed amplitude and phase signal, but as it would have been measured at a plane z anywhere in the source-free half-space for z>=0, parallel to the measured plane $z=z_h$ (wherein the area z<0 contains all the sources).

Regularization may be performed in the wavenumber domain or k-space, which may prevent or reduce any blow-up of noise in the measurements and post-processing equipment, may speed up the process, and may reduce the production of any processing artifacts.

The regularization may comprise cutoff & slope iteration. This iteration may provide an automated form of near-optimal multi-parameter selection for the applied low-pass filter. The cut-off & slope iteration may involve setting initial filter parameters (average cut-off, average slope, for example) of a slope and cut-off variable filter function (with slope and cut-off independent of each other; preferably a modified exponential filter is used). The quality of the reconstruction may be evaluated using e.g. L-curve, GCV, or zeta criterion, which aim to find a near-optimal trade-off between perturbation and filter errors. Cutoff and/or slope of the slope and cut-off variable filter function may be adapted if necessary. A fast minimization algorithm, e.g. a steepest descent algorithm, could be applied to speed up a search for the minimum (to obtain a near-optimal solution for the filter parameters). If the minimum is detected, the iteration stops.

Inverse spatial (2D) FFT may be performed to obtain the desired complex acoustic quantity at $z=z_h=0$ (being the source plane), or any other plane parallel to this plane in the source-free space. The results may be displayed or be used as the input for further processing and/or be used as a control parameter in a process of manufacture, for example.

In the following, a detailed description of the use of windows and zero-padding in PNAH is provided. In practice it may not be an option to measure sound quantities continuously neither in space, nor in time. The finite measurement plane may be represented by a rectangular or truncation window, which basically is one at a given interval of time or space and zero outside. The rectangular function for space in x-direction $\sqcap(x)$ may be defined by $$\sqcap(x) = \begin{cases} 1, & |x| < X/2 \\ \frac{1}{2}, & |x| = X/2 \\ 0, & |x| > X/2. \end{cases} \quad (1)$$

Besides time sampling, discrete acoustic image processing is facilitated by spatial sampling in the form of a limited number of sensor positions within the chosen spatial interval. The sampling function for the spatial domain x-direction is represented in the form of a Dirac comb function, $$\sqcup(x) = \sum_{n=-\infty}^{\infty} \delta(x - x_n), \quad (2)$$

For reasons of simplicity the pressure $\tilde{p}(x, y, z, \omega)$ observed at a distance z and a given angular frequency ω, is written as $\tilde{p}(x, y)$. Spatially sampling a bounded plane $\tilde{p}(x, y)$ by applying ((1)) and ((2)) is mathematically described as $$\tilde{p}(x_n, y_m) = \tilde{p}(x,y) \sqcap(x) \sqcap(y) \sqcup(x) \sqcup(y). \quad (3)$$

Without taking any precautions with respect to leakage and aliasing, its angular spectrum $\hat{\tilde{p}}_z(k_{xn}, k_{ym})$ is computed by $$\hat{\tilde{p}}(k_{xn}, k_{ym}) = \int_{-\infty}^{\infty}\int_{-\infty}^{\infty} \tilde{p}(x_n, y_m) e^{-j(k_x x + k_y y)} dx dy. \quad (4)$$

Taking the finite boundaries of the plane into account the fully discretized pressure counterpart in k-space at the hologram plane $\hat{\tilde{p}}_d$ is written as $$\hat{\tilde{p}}_d(k_{xn}, k_{ym}) = \sum_{n=-\frac{N}{2}}^{\frac{N}{2}-1} \sum_{m=-\frac{M}{2}}^{\frac{M}{2}-1} \tilde{p}_d(x_n, y_m) e^{-2\pi j\left(k_{xn}\frac{n}{N} + k_{ym}\frac{m}{M}\right)}. \quad (5)$$

The discrete solution of the wave-equation in k-space of an unknown, steady state pressure distribution $\tilde{p}(k_x, k_y, z)$ in a source-free half-space, $z > 0$, may be defined as $$\hat{\tilde{p}}_d(k_{xn}, k_{ym}, z) = \hat{\tilde{p}}_d(k_{xn}, k_{ym}, z_h) e^{jk_z(z-z_h)}, \quad (6)$$

where $z = z_h$ is the hologram distance. From ((6)) it follows that we need to determine $k_z$ from the wavenumbers in both x- and y-direction, i.e. $k_x$ and $k_y$, and the acoustic wavenumber k that follows from $\omega$ and $c_0$. In k-space $k_z$ is determined by $k_z = \pm\sqrt{k^2 - k_x^2 - k_y^2}$ of which three types of solutions to this equation, with k already known, can be found:

$k_x^2 + k_y^2 = 0$ plane wave in z-direction, $0 < k_x^2 + k_y^2 \leq k^2$ propagating waves; $k_z$ real, $k_x^2 + k_y^2 > k^2$ evanescent waves; $k_z$ complex. (7)(8)(9)

The radiation circle lies exactly at $k^2 = k_x^2 + k_y^2$ and is denoted as $k_r$, outside this circle waves are evanescent, whereas inside waves are propagating. Applying ((6)) to propagating waves (((7)) and ((8))) results in a phase shift, evanescent waves ((9)) are multiplied in k-space by an exponential power of increasing strength with increasing $k_z$. Before this operation in k-space is possible, the spatial data is first pre-processed before the FFT is applied. A window may be applied in order to reduce leakage. It is shown below that especially the higher wavenumbers are very vulnerable to leakage and signal distortion by the FFT.

The finite aperture of a sensor array measurement is observed spatially as a truncation window. Outside the measured aperture there exists no directly sampled knowledge of the sound field, thus the two-dimensional k-space is determined from a coarse, spatially sampled and finite aperture. The application of a window is observed as a procedure to reduce the order of the discontinuity at the border of the periodic extension of the aperture in the FFT processing. This is realized by smoothly attenuating the data near the edges to zero. If, from another point of view, a basis set of wavenumbers for a given interval N is defined, and there exists a signal in this set with a wavenumber not exactly mappable on one of these basis wavenumbers, then the window application maps this signal to the basis wavenumber closest to the original wavenumber of the signal. In other words, the wavenumber or k-space resolution of the spectrum is too low.

In order to illustrate these projections on a set of basis wavenumbers an example is given. Assume a one-dimensional spatial pressure measurement with N=10 samples in a finite aperture. The normalized sampling wavenumber is $k_s = 2\pi$, and the sampling interval or wavenumber resolution of $$\Delta k = \frac{1}{5}\pi.$$

The first sine function that exactly fits one period on the basis wavenumbers is $$k = \frac{1}{5}\pi,$$

the second one exactly fits two periods in the aperture, i.e., $$k = \frac{2}{5}\pi,$$

and so on. Leakage is caused in particular by processing finite aperture data rather than by the spatial sampling. A discontinuous edge at the aperture may indicate the presence of non-fitting periodic signals, and thus may cause leakage to a large number of wavenumbers.

A large number of one-dimensional windows suitable for harmonic analysis are known in the art. These may also be applicable to two-dimensional spatial aperture processing. Unlike digital audio processing and spectral analysis, which often includes many thousands of samples, acoustic array measurements generally exhibit several tens of sensors in one direction at most. This means only coarse aperture data is available, which requires a careful process to determine the proper k-space with as much preserved spatial information as possible. Often this implies a trade-off between k-space leakage and loss of acoustic information, especially near the edges of the aperture. Take, for example, the Hanning window, which has very low leakage sidelobes and a relatively wide mainlobe. For k-space representation this window may be very appropriate, yet the consequences in the spatial domain may be undesirable since only the data at the center of the aperture remains unaltered by the window. An opposite of the Hanning window is the rectangular or Dirichlet window, in which the sidelobes are much higher, yet the mainlobe is relatively narrow. The spatial domain influence is preferable, yet the leakage in k-space provides high levels of disturbance after inverse propagation and FFT. The rectangular window is only fitted for aperture measurements which show no acoustic variations along the complete border of the aperture, which is very difficult to achieve. A good compromise between the above mentioned windows is the Tukey window, which may be defined as:

$$w(n) = \begin{cases} \frac{1}{2}\left[1 + \cos\left(\frac{2\pi}{\alpha}\frac{(n-1)}{(N-1)} - \pi\right)\right], & n < \frac{\alpha}{2}(N-1) + 1, \\ 1, & \frac{\alpha}{2}(N-1) + 1 \leq n \leq N - \frac{\alpha}{2}(N-1), \\ \frac{1}{2}\left[1 + \cos\left(\frac{2\pi}{\alpha} - \frac{2\pi}{\alpha}\frac{(n-1)}{(N-1)} - \pi\right)\right], & N - \frac{\alpha}{2}(N-1) < n, \end{cases} \quad (10)$$

where n=1 to N and $\alpha$ between 0 and 1. In the lower limit of $\alpha = 0$ the Tukey window is similar to the rectangular window, while it evolves to the Hanning window as $\alpha$ increases to become $\alpha = 1$. In between these extremes, the Tukey window is a combination of a cosine tapering near the edges and a non-attenuated area near the center of the aperture. Application of this window may be regarded a compromise between attenuation of acoustic data near the aperture border and the amount of leakage in k-space. The two-dimensional Tukey window follows from the transpose vector of the window from ((10)) in y-direction multiplied with the row vector of the window in the x-direction:

$$w(n,m) = w(m)^T * w(n). \quad (11)$$

A comparison is made between a number of settings for α in the Tukey window, including the rectangular and Hanning window settings, to determine the influence of leakage on the inverse process of PNAH. Decreasing α may cause the leakage sidelobes to become higher, when the exponential inverse propagation curve for k-space is multiplied with the window transform the threat of leakage becomes visible, since the sidelobes are attenuated by the inverse propagator.

Window compensation after the complete inverse propagation process is an option, yet due to the applied window the wavenumbers may have shifted and results near the edges may be heavily affected. The inverse propagation and the discrimination of strengths between individual wavenumber bins may be too varied to compensate with an inverse window. A promising alternative is to pre-process the data before the FFT is applied.

By zero-padding it is possible to discriminate between more wavenumbers within the spectrum. If a finite aperture is considered, with edge values and all orders of the derivative near the edge at zero, and an FFT is applied on the spatially sampled data, then the resulting k-space spectrum may be free of spectral leakage as discussed in the previous section. However, due to the finite number of sampling points in this perfect aperture, only a discrete number of wavenumber bins may be available to map the data on. The discrete k-space is only a representation or mapping of the continuous spectrum on the set of basis wavenumbers. Wavenumbers present in the spatial data remain hidden in k-space if their periods do not exactly match the discrete wavenumbers. This finite resolution in k-space is due to the finite length of the spatial aperture, which is visible in the DFT of such an aperture.

If the spatial aperture is increased while padding the new samples with zero value, the solution power of the DFT may increase, resulting in an increased resolution in k-space. Now, a greater number of wavenumbers may be distinguished from the spectrum. Every single bin increase above the aperture size may increase the number of bins in k-space and wavenumber resolution:

$$\Delta k = \frac{2\pi}{N+v},$$
$$v = 0, 1, 2, L.$$

In order to maintain the original wavenumber bins, the aperture size may be expanded by an integer number of the original aperture size:

$$\Delta k = \frac{2\pi}{wN},$$
$$w = 1, 2, 3, L.$$

In case of PNAH, consecutive application of a spatial window followed by zero-padding may be a fast and precise method to increase k-space resolution and increase the differentiability of propagating and evanescent waves. Another practical consideration for zero-padding is the calculation speed advantage that may be accomplished by expanding the total number of samples in either direction to a power of two, resulting in N log N operations, as is known in the art. Careful investigation of the characteristics of windowing and zero-padding may lead to the development of border-padding, which inhibits good characteristics of the these methods and reduces the negative aspects.

When applying border-padding, the original aperture may be kept intact while the information at the border is used to pad or extrapolate unknown data outward. Due to the above-described windowing methods, a significant part of the edges of the data may get affected and large errors may be introduced. In practise, while using these windowing methods, it is advantageous to enlarge the measured aperture and make sure the interesting sources are not situated near the border. Another alternative is to use a direct method without using the Fourier transform. However, border-padding offers the possibility to keep the aperture sizes small with a minimum of edge erosion.

Border-padding deals with these problems as follows. Instead of padding the added samples with zeros, the values of the samples at the edge or border of the signal are padded, filling up the added samples. After spatial extrapolation, a spatial window on the complete set of data, including the border-padded part, is applied. The Tukey window is especially fitted for this purpose since the constant part of the window may be placed over the original aperture, while the cosine-tapered part may cover the border-padded region. In this way the spatial window does not affect the acoustic information and leakage may be reduced as well. Such a one-dimensional operation may be expressed, for example as $$\tilde{p}_b(n_b) = \quad (12)$$

$$\begin{cases} \frac{1}{2}\tilde{p}(1)\left[1 + \cos\left(2\pi\frac{(n_b-1)}{\left(\frac{N_b-N}{2}-1\right)} - \pi\right)\right], & n_b \leq \frac{N_b-N}{2}, \\ \tilde{p}(n), & \frac{N_b-N}{2} < n_b \leq N_b - \frac{N_b-N}{2}, \\ \frac{1}{2}\tilde{p}(N)\left[1 + \cos\left(\pi - 2\pi\frac{(n_b-1)}{\left(\frac{N_b-N}{2}-1\right)}\right)\right], & n_b > N_b - \frac{N_b-N}{2}, \end{cases}$$

where $\tilde{p}_b(n_b)$ is the border-padded aperture, for $n_b=1, \ldots, N_b$ with $N_b$ the border-padding length. The fully border-padded aperture includes the original aperture $\tilde{p}(n)$, which is placed in the center of the border-padded aperture, with $n=1, \ldots, N$ and $N_b > N$. The two-dimensional aperture may be completely border-padded by first applying ((12)) to every row followed by the resulting columns, or vice versa.

Still, this form of border-padding may cause leakage, which may be due to the used Tukey window and the crossover area between aperture and padded area where the first derivative function is often discontinuous. Especially the discontinuous derivative at the border introduces errors near this point, leaking back into the original aperture and thus causing errors in the determined acoustic source strengths and shapes.

Linear predictive filtering is a method that determines samples outside a signal area by an approximation based on a chosen number of previous samples. For a finite spatial aperture, first, one row or column of data may be used to calculate the impulse response coefficients. Secondly, a digital filter may be initialized by the impulse response coefficient. Finally, a zero-valued vector may be fed into the filter which spans the eventual border-padded width to this side of the aperture. Both ends of the finite aperture may be extrapolated by this procedure. After every desired row or column is padded, the same sequence may be applied in the other direction, including the border-padded parts. This results in a fully border-padded hologram, which is fit for two-dimensional FFT. To make sure no leakage from the outer edges is generated a wide Tukey window may be generated that applies a tapering, for example a cosine tapering, far from the measured hologram.

Assume measured acoustic pressure $\tilde{p}(x_n, z)$ over a single line of the holographic aperture, which is N samples in size and z>0 in a source-free half-space. The vector $\tilde{p}(x_n)=[\tilde{p}(x_1), \tilde{p}(x_2), \tilde{p}(x_3), K, \tilde{p}(x_N)]$ may be expanded outside this interval, creating border-padded samples to the right $[\tilde{p}(x_{N+1}), \tilde{p}(x_{N+2}), \tilde{p}(x_{N+3}), K]$ or to the left $[K, \tilde{p}(x_{-2}), \tilde{p}(x_{-1}), \tilde{p}(x_0)]$ of the aperture. Ideally, a number of prediction filter coefficients predicts these samples perfectly, i.e., with zero prediction error, based on Q previous samples. The newly acquired sample is noted as $p(x_s)$, a linear description of such a filter is written as $$\tilde{p}(x_s) = \sum_{i=1}^{Q} h_i \tilde{p}(x_{s-i}), \qquad (13)$$

where $h_i$ are the prediction filter coefficients of $h=[h_1, h_2, K, h_Q]$, the prediction filter vector. This equation is rewritten in convolution form as $$\tilde{p}(x_s) = h_s * \tilde{p}(x_s) = \sum_{i=-\infty}^{\infty} h_i \tilde{p}(x_{s-i}). \qquad (14)$$

In a causal system, it holds that $h_i=0$ for $Q<i<1$, since the pressures at $x_1$ to $x_Q$ are already known and $h_0=0$ by definition.

The measured, noisy data used for practical NAH is far from perfect and the analytical solution for h may only exist in theory with theoretical signals. The real world may benefit from an iterative method based on the determination of a linear prediction error coefficients $a=[1, a_1, a_2, K, a_v]$, which are converted to impulse response coefficients by $$h=[h_1, h_2, K, h_Q]=[-a_1, -a_2, K, -a_v]. \qquad (15)$$

Several methods can be used to determine a fitting model to the signal. The Burg method has the advantage of being minimal phase (i.e., all $a_i$ remain within the unit circle in the complex plane). The Burg method is also suitable for few observed samples (which is often the case in NAH measurements). The Burg method was initially introduced for estimating power density spectra of stationary time series, and is used in digital time series audio processing and extrapolation. Additionally, the spatial domain is a viable area for implementation, since time-frequency processing is in many respects correspondent to space-wavenumber processing. The Burg method is used to fit an autoregressive model (AR) on $\tilde{p}(x_n), n=1, 2, L N$. This model is then used in the implementation of the filter, yet first a physical foundation for this method is described.

Before the actual implementation of border-padding by means of a linear prediction filter is discussed, the viability of this procedure with respect to spatial acoustic fields is determined here.

Generally, in NAH an unknown, steady state pressure distribution $\tilde{p}(x, y, z)$ in a source-free half-space, z>0, is considered. This pressure in k-space $\hat{p}(k_x, k_y, z)$ may be expressed by a sum of planar and evanescent waves, or a sum of cosines as a function of wavenumbers $k_x$ and $k_y$ as $$\hat{p}(k_x, k_y, z) = \sum_{k_x} \sum_{k_y} \hat{p}(k_x, k_y) e^{j(k_x x + k_y y + k_z z)}. \qquad (16)$$

A plane wave in the x-direction is possibly described by a cosine function, which is a superposition of two phasors according to Euler's formula:

$$\cos k_x x = \frac{e^{jk_x x} + e^{-jk_x x}}{2}. \qquad (17)$$

The wavenumber spectrum of this cosine, which is represented by two phasors, is represented by two Dirac delta functions. For extrapolation of this cosine function two impulse response coefficients are required, a single phasor is naturally extrapolated by $$e^{jk_x n \Delta x} = h_1 e^{jk_x (n-1) \Delta x}, \text{ with } h_1 = e^{jk_x x}, \qquad (18)$$

and the cosine extrapolation is a sum of two phasors:

$$\cos(k_x n \Delta x) = \qquad (19)$$
$$h_1 \frac{e^{jk_x(n-1)\Delta x} + e^{-jk_x(n-1)\Delta x}}{2} + h_2 \frac{e^{jk_x(n-2)\Delta x} + e^{-jk_x(n-2)\Delta x}}{2},$$

with $h_1 = 2 \cos(k_x \Delta x)$ and $h_2 = -1$. It follows that the discrete acoustic spatial information at the hologram plane may be Fourier transformable and completely and uniquely represented by a finite sum of impulse responses.

A general form difference function for a direct form IIR filter may be defined for spatial sound pressure as $$\sum_{i=0}^{v} a_i \tilde{p}_b(x_{s-i}) = \sum_{i=0}^{w} b_i \tilde{p}(x_{s-i}), \qquad (20)$$

where $a_i$ and $b_i$ represent the filter coefficients, which are part of the coefficient vectors with lengths v+1 and w+1 respectively, $\tilde{p}_b(x_s)$ is the unknown sound pressure outside the aperture and $\tilde{p}(x_s)$ the initializing value that serves as input to the IIR filter. The value for the initialization $\tilde{p}(x_s)=0$ for all s, thus the output in ((20)) may be $$\tilde{p}_b(x_s) = -\frac{1}{a_0} \sum_{i=1}^{v} b_i \tilde{p}_b(x_{s-i}). \qquad (21)$$

This implementation for the IIR filter based interpolation is similar to the convolution extrapolation from ((14)) when $a_0=1$, which defines the filter causality, $a_i=-h_i$, $b_i=1$ and w=0 and may result in the final IIR difference equation:

$$\tilde{p}_b(x_s) = \sum_{i=1}^{v} b_i \tilde{p}_b(x_{s-i}) + \tilde{p}(x_s). \qquad (22)$$

The filter order may be bounded by the number of available samples in the finite aperture, yet the choice of the optimal order is not entirely straight forward. The presence of high wavenumbers in the aperture data requires a higher order description, yet also noise is present at these higher wavenumbers which potentially causes problems for the inverse solution of a finite, discrete aperture. The k-space low-pass filter is also of influence, since an applied filter which is significantly lower than half the sampling wavenumber already lowers the relevant order of the linear predictive filter.

Figure 7:
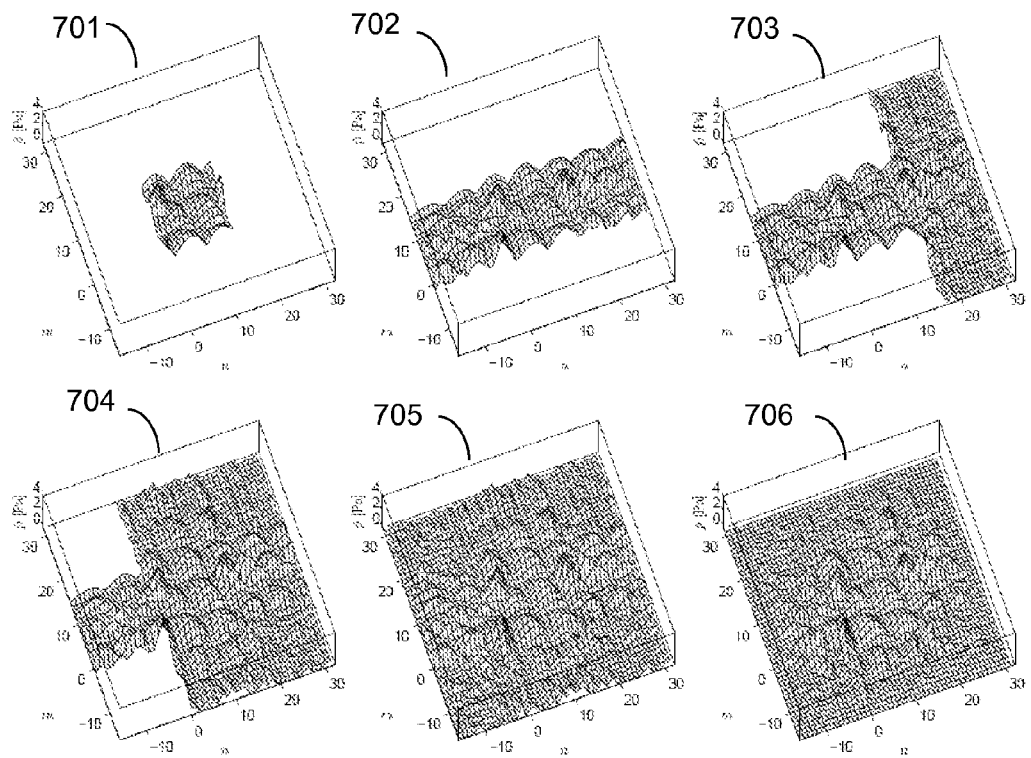
FIG. 7 illustrates intermediate results in a process of padding of data.

The implementation provided above extrapolates, for example, only one row to the right of a hologram aperture, however, an extended, two-dimensional implementation is also provided, as illustrated in FIG. 7. First, the two-dimensional hologram measurement data $\tilde{p}_h(x_n, ym)$ (graph 701) is border-padded in the positive and negative x-direction, as illustrated in graph 702. Subsequently, the partly border-padded data is extrapolated in the positive and negative y-direction, also including the previously non-existing, border-padded parts, as illustrated in graphs 703-705. FIG. 7 illustrates how this process fills up a full array of data consisting of originally measured signals and surrounding, fully border-padded data.

From windowing theory it follows that data near the edges of the extended aperture may go to zero for a number of derivatives. This may also be the case for border-padded data. This may be overcome using a form of windowing or tapering. There are at least two options for border-padding: firstly, a standard type window may be applied, and, secondly, the negative aperture end may be connected with the positive aperture end of the data. Illustrated in FIG. 7 at graph 706 is the border padded signal of graph 705, in which a 2D Tukey window with a cosine tapering has been applied to one-third of the extrapolated data.

A well-known issue with inverse problems is a blow-up of noise after processing the inverse solution of measured data, this is also referred to as an ill-posed problem. In this description, regularization procedures for near-field acoustic holography will be split up into filter functions and stopping rules. The filter functions and stopping rules are specifically derived and defined for k-space processing in order to speed up the process. Modified versions of both the exponential and Tikhonov filter are introduced that are specifically applicable for NAH problems. Complementary to the modified filter types, three main type low-pass filters, namely the exponential, Tikhonov and truncation filter, will be discussed. Also, consequences of extremely steep and smooth sloped filters are discussed.

A way to discriminate between high wavenumbers polluted with noise, and useful information at somewhat lower evanescent and propagating waves, is to apply a low-pass, cosine tapered filter. The cut-off wavenumber $k_{co}$ determines the characteristic point in k-space where the low-pass filter has dropped in magnitude by half. The slope that connects the all-stop and all-pass regions of the filter function can be defined in various ways. The attenuation of propagating waves is countered by a new filter function, which is a modified version of the general form exponential filter, which is given below. A modified version of the exponential filter takes the $k_{xy}=k_r$ limit into account, which means no propagating data within the radiation circle is altered. Below $k_{xy}=k_r$ waves are propagating in nature and remain unaltered in magnitude by the inverse procedure, thus there exists no possibility of noise blow-up and therefore the low-pass filter will only introduce unnecessary errors if the taper starts in this area. Only wavenumbers at $k_{xy}>k_r$ are interesting in terms of spatial resolution improvements, yet they also may cause noise blow-up problems. A new definition of a modified exponential filter prevents altering propagating waves, while the cut-off and slope are easily and independently modified. The modified exponential filter is defined by $$H_f^{k_{co},\phi} = \begin{cases} 1, & k_{xy} < k_{co} - k_{ev}\phi, \\ \frac{1}{2} + \frac{1}{2}\cos\left(k_{xy} - \frac{(k_{co} - k_{ev}\phi)}{2k_{ev}\phi}\pi\right), & k_{co} - k_{ev}\phi \le k_{xy} \le k_{co} + k_{ev}\phi, \\ 0, & k_{xy} > k_{co} + k_{ev}\phi, \end{cases} \quad (23)$$

where $k_{ev}=k_{co}-k_r$ (>0) is the useful evanescent k-space content and $\phi$ the taper ratio between 0 and 1. At $\phi=0$ the filter slope is infinitely steep, equal to a truncation filter that is discussed below. With increasing $\phi$ the slope becomes less steep. From $k_{xy}=0$ up to at least $k_{xy}=k_r$, the filter passes all energy. The area directly outside the radiation circle up to $k_{xy}=k_c$ and the $\phi$ dependant tapering area outside determines the height of the spatial resolution improvement of NAH compared to beam-forming. Outside this region the data may be flawed with measurement and numerical noise.

The differences between the modified and the general form exponential filter function may be observed by comparison of the modified exponential filter with the general form exponential filter, which is defined by $$H_f^{k_{co},\gamma} = \begin{cases} 1 - \frac{1}{2}e^{-(1-k_{xy}/k_{co})/\gamma}, & 0 < k_{xy} < k_{co}, \\ \frac{1}{2}e^{(1-k_{xy}/k_{co})/\gamma}, & k_{xy} \ge k_{co}, \end{cases} \quad (24)$$

where the slope is determined by the chosen factor $\gamma$. Although this is an elegant definition of the exponential low-pass filter, there is a potential drawback for its utilization in NAH: It is possible to choose a $\gamma$ that will cause propagating waves to get filtered out at low values of $k_{co}$. This may in some cases increase the resulting error of the full inverse process.

Tikhonov regularization is a widely discussed statistical method, also known as ridge regression. Similar to the exponential filter the result after Tikhonov regularization is also a low-pass k-space filter, which will become clear from the following.

To derive the low-pass Tikhonov filter function in its general form for a sound pressure hologram and desired sound pressure at the source plane the forward problem is written as $$\bar{p}_h = F^{-1}GF\bar{p}_s. \quad (25)$$

Notice that $\bar{p}_h$ and $\bar{p}_s$ represent the spatial sound pressure information at the hologram plane and source plane respectively, written in vector form. The discrete spatial Fourier transforms are represented by the matrix operators $F$ and $F^{-1}$, while $G$ is a diagonal matrix containing the forward propagators for the pressure to pressure problem. The standard Tikhonov minimization for the forward problem is written as $$\min\{PQ\bar{p}_s - \bar{p}_hP_2^2 + \lambda^2 PL\bar{p}_sP_2^2\}, \quad (26)$$

with $$Q = F^{-1}GF. \quad (27)$$

The regularized solution for $\bar{p}_{s,\lambda}$ in k-space is written as $$\bar{p}_{s,\lambda} = \frac{G^T G}{G^T G + \lambda^2 L^T L} G^{-1} \bar{p}_h = H_\lambda^f G^{-1} \bar{p}_h. \quad (28)$$

The case where matrix $L=I_n$, with $I_n$ the identity matrix, is known as the general or standard form Tikhonov function. The general form Tikhonov filter function is written as a function of $k_{xy}$ as $$H_f^\lambda(k_{xy}) = \frac{g(k_{xy})^2}{g(k_{xy})^2 + \lambda^2}. \quad (29)$$

For the case where the inverse solution is the sound pressure obtained from a sound pressure hologram, it follows that $$g(k_{xy}) = e^{-j\sqrt{k^2 - k_{xy}^2}(z-z_h)}, \quad (30)$$

and the resulting low-pass filter function for $L=I_n$ becomes $$H_f^\lambda(k_{xy}) = \frac{1}{1 + \lambda^2 e^{2j\sqrt{k^2 - k_{xy}^2}(z-z_h)}}. \quad (31)$$

A relationship between the filter cut-off and the regularization parameter $\lambda$ is easily obtained from the fact that by definition $$H_f^\lambda(k_{co}) = \frac{1}{2}$$

at the filter cut-off, which results in $$\lambda = e^{-j\sqrt{k^2 - k_{co}^2}(z-z_h)}. \quad (32)$$

An important factor in the quality of the Tikhonov filter is the choice of L. The Fourier representation of L in k-space is a weight function that connects a certain importance to the wavenumbers in the spectrum. For $L=I_n$ all wavenumbers are equally weighted, but the inverse solution of the acoustic wave equation might require a different approach. Wavenumbers within the radiation circle ($k_{xy}=k$) are propagating waves that are unaffected by the noise blow-up effects of the inverse solution. However, with increasing wavenumber from the radiation circle outward the sensitivity to noise blow-up increases. As a consequence, it seems natural to choose a weight function L with the characteristic of a high-pass filter, such that the higher wavenumbers are more heavily weighted than the lower ones.

The inverse of the general form Tikhonov may be used, which results in a high-pass filter function for L, $$\bar{p}_{s,\lambda} = \frac{G^T G}{G^T G + \lambda^2 (H_{f,hp}^\lambda)} G^{-1} \bar{p}_h. \quad (33)$$

This results in a k-space low-pass filter function $$H_f^\lambda(k_{xy}) = \frac{g(k_{xy})^2}{g(k_{xy})^2 + \lambda^2((g(k_{xy})^2 + \lambda^2)/g(k_{xy})^2)}, \quad (34)$$

This method would potentially produce an unlimited number of Tikhonov filters by substituting the inverse of Equation ((34)) into ((15)) again, and so on. A very computationally efficient method is introduced in order to find a suitable low-pass filter and use the inverse for the weight function L. Any high pass filter function is possible here, although obvious choices are the inverse values of the filter functions given in ((8)), ((24)), and ((31)), since these are especially fit for NAH problems. The resulting high-pass function $H_{f,hp}(k_{xy})$ is inserted into the modified Tikhonov function $$H_f^\lambda(k_{xy}) = \frac{g(k_{xy})^2}{g(k_{xy})^2 + \lambda^2(H_{f,hp}(k_{xy}))^2}, \quad (35)$$

For a fixed $k_{xy}=k_{co}$ the general form produces a smooth sloped filter, while the stronger weight functions produce steeper slopes, with the steepest filter produced by the truncation function. In the regularization process both $\lambda$ and $H_{f,hp}(k_{xy})$ are determined with identical $k_{co}$, although $H_{f,hp}(k_{xy})$ could also be determined independently.

The result of the low-pass truncation filter is twofold: First, it passes the band up to $k_{co}$ and, secondly, stops all wavenumbers higher than $k_{co}$. The slope is infinitely steep and the filter function is defined by $$H_f^{k_{co}} = \begin{cases} 1, & k_{xy} < k_{co}, \\ \frac{1}{2}, & k_{xy} = k_{co}, \\ 0, & k_{xy} > k_{co}, \end{cases} \quad (36)$$

It appears to provide a very good discrimination between useful and useless evanescent waves, however, the infinite slope introduces errors that are highly dependant on the presented data. The choice of the inverse of (36) for $H_{f,hp}(k_{xy})$ in ((35)) generally results in very steep modified Tikhonov filters. The next paragraph will address this problem and the influence of the slopes in the filters discussed above.

Ideally, a low-pass filter passes all wavenumbers below $k_{co}$, and halts all wavenumbers above. In very specific situations, like modal patterns in plates, a low-pass truncation filter results in a good reconstruction, on the other hand, in practice this type of filter will mostly result in distortion of the result.

The problem may be caused by the Fourier Transform of the rectangular function $\sqcap(x)$, which is written in continuous form as $$\int_{-\infty}^{\infty} \sqcap(x) e^{-jkx} dx = sinc\left(\frac{k}{2\pi}\right). \quad (37)$$

This expression illustrates the effect that may emerge when the k-space source data, before inverse FFT, has a rectangular shape. A possible situation is wide-band k-space data combined with a truncation low-pass filter, for example, a wide-band k-space spectrum that emerges from point-like source behavior. The FFT of a point-like source contains energy over a wide k-space band, a sudden interruption of this pattern will result in a ringing- or "sinc"-effect emerging from the original position of the point-like source, after inverse FFT.

Finite slopes tend to suppress the ringing effect and smoothen the result. A drawback of a smoother slope is the suppression of useful information at lower, and passing of noise at higher wavenumbers than $k_{co}$. Also, when a different source is chosen, the ringing effect is significantly less apparent. The discrete k-space content of the signal results in discrete peaks in the spectrum. A steep slope has no influence on the source data, and could very well be applied in this particular case. In fact, a smooth filter with finite slope could possibly result in an inferior result.

Regularization is used for stabilizing an ill-posed problem and pick out a stable solution with useful, or spatially detailed information. This approach requires additional information about the solution, and although there are many ways to gather additional information, the general method is to define a residual of the acquired solution. The idea is to find a trade-off between a sufficiently detailed regularized solution and a small residual norm. In filter terms the noise at high wavenumbers should be suppressed, whereas the propagating waves should remain unaltered. The interesting information for the inverse solution is located outside the radiation circle. Evanescent waves with a good dynamic range pass through the filter, and on the other hand noisy wavenumbers are attenuated or stopped. The minimization process of the solution and residual term tries to find the proper filter function settings.

The previously discussed filter functions and regularization schemes show clear differences, yet they all share the same requirement of a stopping rule. This section will discuss three main types of stopping rule methods, two of which are applicable to all previously discussed filter functions; the L-curve and generalized cross-validation (GCV). The third stopping-rule, Cut-Off and Slope (COS) iteration, is specifically designed for the modified exponential filter. All stopping rules discussed in this paper share the property of not requiring an estimate of the noise variance, which is beneficial for flexibility and speed of the holography system.

The L-curve criterion is based on a parametric plot of the norm of the regularized solution versus the residual norm after filtering. The residual norm, given by $$\rho(\lambda) = \log \|Ax_{reg} - b\|_2. \tag{38}$$

in the general form, is large when $k_{co}$ is small and $\lambda$ is large. This is due to the fact that the low-pass filter applied, suppresses a wide band of x, leaving a large residu. By increasing $k_{co}$ (decreasing $\lambda$) the residu becomes smaller. To find the trade-off value for $k_{co}$ between the filter errors (over-smoothing) and perturbation errors (blow-up) in the inverse solution, the perturbation norm is required and defined as $$\eta(\lambda) = \log \|x_{reg}\|_2. \tag{39}$$

The perturbation norm behaves opposite to the residual norm, hence the perturbation norm increases with increasing $k_{co}$. After a series of increasing $k_{co}$ and plotting $\eta(k_{co})$ versus $\rho(k_{co})$ in a log-log scale, an L-shaped curve results.

The point on the L-curve with maximum curvature, which corresponds to the near-optimal solution, is determined by $\max\{\kappa(\lambda)\}$ with $$\kappa(\lambda) = \frac{\rho'\eta'' - \rho''\eta'}{((\rho')^2 + (\eta')^2)^{\frac{3}{2}}}, \tag{40}$$

where the dash represents the first derivative and the double dash the second derivative with respect to the running variable $\lambda$. The expression for the L-curvature from (40) is impracticable and a discrete algorithm is required for proper determination of the corner when only a limited number of filter cut-offs is available.

The filter norm (residual norm) in the L-curve criterion in k-space can be determined from hologram and filter information only. To prove this the filtered hologram data in k-space is defined for measured sound pressure as $$\bar{p}_{hf} = H_f \bar{p}_h, \tag{41}$$

where $H_f$ is the filter function matrix operator for any of the previously discussed filter functions. The filtered sound pressure $\bar{p}_f$ at the source plane is written as $$\bar{p}_f = G^{-1} H_f \bar{p}_h. \tag{42}$$

Both the inverse propagator $G^{-1}$ and the filter matrix $H_f$ are diagonal. The forward problem with input signal $\bar{p}_{sf}$ can be written as $$\bar{p}_h(\bar{p}^{sf}) = GG^{-1} H_f \bar{p}_h = H_f \bar{p}_h = \bar{p}_{hf}, \tag{43}$$

which results in an effectively calculable filter norm, $$\rho(k_{co}) = \|G\bar{p}_{sf} - \bar{p}_h\|_2 = \|(H_f - I_n)\bar{p}_h\|_2. \tag{44}$$

It follows that the inverse propagator is not required to determine the smoothing factor of the applied filter.

The perturbation norm uses the inverse propagator and the filter operator together with the hologram data, because the blow-up of noise is due to incompetent filtering and a high exponential power. In k-space the perturbation norm is $$\eta(k_{co}) = \|PG^{-1} \bar{p}_{hf}\|_2 = \|P\bar{p}_{sf}\|_2. \tag{45}$$

Since all discussed filter functions are valid for the above stated norms, this is the general form L-curve criterion for application in k-space.

Generalized Cross-Validation (GCV) is another error-estimate-free stopping rule for estimating the filter parameters. GCV is in fact a modified version of the Ordinary Cross-Validation (OCV), which is a systematic way of determining the filter parameters from the measured data. A modification to the OCV in GCV is the addition of a weighting function, which makes the method invariant to orthonormal tranformations. In the NAH inverse method orthonormal transformations are key factors, and application of OCV would make the filter function dependant on the inverse propagator.

Ideally, the Mean Squared Error (MSE) of the regularized solution and the exact solution would result in the average of the noise present in the measured data, which can be written as $$\frac{1}{n}\sum_{j=1}^{n}(\bar{p}_{sf} - \bar{p}_{s,exact})^2 = \sigma^2. \tag{46}$$

Since the noise average and the exact solution are unknown in the NAH case, an estimation of this MSE is required in order to find a good estimate of the filter parameters. The GCV function for NAH is written as $$GCV(k_{co}) = \frac{1}{n} \sum_{j=1}^{n} (\overline{p}_{sf} - \overline{p}_{s,exact})^2 w_i(k_{co}), \quad (47)$$

where the weights $w_i$ are primarily determined by the filter factors as a function of $k_{co}$ and defined as $$w_i(k_{co}) = \left( \frac{[1 - h_{f,ii}]}{\left(1 - \frac{1}{n} Tr[GH_f]\right)} \right)^2. \quad (48)$$

The resulting minimizing function has a numerator that is dominated by the mean squared regularization error (comparable to the horizontal axis in the L-curve), while the denominator represents the perturbation error (vertical axis in the L-curve). Equation ((47)) is rewritten as $$GCV(k_{co}) = \frac{P(I - H_f^{k_{co}})P\overline{p}_h}{Tr[(I - H_f^{k_{co}})G]}. \quad (49)$$

$GCV(k_{co})$ has a global minimum value for $k_{co}$ which represents a trade-off between over-smoothing and blow-up of noise, based on statistical analysis of noise properties.

For both L-curve and GCV either the cut-off or slope of the filter is set, while inherently fixing the other filter parameter. This phenomenon limits the number of possible solutions to choose from. Often only the cut-off is adapted, while the slope is ignored. A solution to this limitation in the filter parameters is an iterative process based on the modified exponential filter introduced earlier. In the modified exponential filter both $k_{co}$ and $\phi$ may be varied independently, and the resulting filter functions for all possible combinations of discrete values for $k_{co}$ and $\phi$ within defined margins are tested by an existing minimization criterium.

The GCV criterium in k-space defined before is possibly a good parameter selection for the cut-off and slope of the modified exponential filter, and may be calculated in k-space, which is computationally advantageous. For a certain cut-off and slope the GCV function will show a global minimum, and the corresponding $k_{co}$ and $\phi$ may be chosen for the modified exponential low-pass filter function.

A second, alternative, criterion that also searches the trade-off between perturbation and over-smoothing is based on the L-curve criterium. The perturbation norm η and and residual norm p tend to zero for increasing and decreasing λ respectively. Practical difficulties in determining the point of maximum curvature in a three-dimensional L-curve, may be overcome by using a single minimizer, such as $$\xi(k_{co},\phi) = \hat{\rho}(k_{co},\phi)\hat{\eta}(k_{co},\phi). \quad (50)$$

where $\hat{\rho}$ and $\hat{\eta}$ represent the normalized residual and perturbation norm respectively. The normalized residual norm is defined as $$\hat{\rho}(k_{co}, \phi) = \frac{\rho(k_{co}, \phi)}{\max\{\rho(k_{co}, \phi)\}}, \quad (51)$$

and the normalized perturbation norm as $$\hat{\eta}(k_{co}, \phi) = \frac{\eta(k_{co}, \phi)}{\max\{\eta(k_{co}, \phi)\}}. \quad (52)$$

The product in ((50)) may have a global minimum as a function of $k_{co}$ and $\phi$ defined as $\min\{\xi(k_{co},\phi)\}$. The cut-off $k_{co}$ and slope $\phi$ corresponding to the minimum are picked as modified exponential filter parameters, which is referred to as the ξ-criterium. This criterium shows solutions that lie to the left in the L-curve compared to the solution resulting from the adaptive pruning algorithm, yet still in the elbow area of the curve. This behavior proves to be beneficial for high SNR cases in terms of high resolution results.

It will be understood that model-based extrapolation, in particular linear predictive extrapolation, may be used for data padding before applying discrete Fourier transforms. This technique can be applied in any digital signal processing application to reduce leakage and/or aliasing, for example in image or video processing. It will also be understood that cut-off and slope optimization may be used in other regularization applications than those disclosed herein, for example in computed tomography applications.

Automated Spatial Setup

An appropriate spatial setup for the near-field acoustic holography measurement points may be established in a systematic way. The correct hologram distance, inter-sensor step-size, frequency of interest and the source versus hologram orientation and maximum dynamic range are determined for optimal calculation of the inverse solution by near-field acoustic holography.

Spatial aliasing and incorrect inverse source calculation are some of the problems that may arise from errors in the spatial setup. The spatial setup may be optimally determined by automated outline of source and hologram plane, optimal measurement distance based on the required spatial sampling (sensor placement) in the hologram and the maximum dynamical range.

Non-parallel planes in planar near-field acoustic holography (also holds for cylindrical and spherical configurations) may result in sources that are (partly) positioned in front of the source plane and in the source-free half-space required for correct calculation. The exponential factor for evanescent waves in the inverse calculation then results in relatively large errors in the source determination.

Spatial aliasing possibly occurs when $$\sqrt{k^2 + \left(\frac{D_{max}\ln 10}{20(z_h - z_s)}\right)^2} > 0.5 k_{sample} \quad (60)$$

is true, where $$k = \frac{\omega}{c_0}$$

is the wavenumber in $$\left[\frac{\text{rad}}{\text{m}}\right],$$

($z_h$-$z_s$) the exact distance between hologram and source, $k_{sample}$ the sampling wavenumber based on the inter-sensor step-size and $D_{max}$ the maximum dynamical range over the hologram. Consequently, spatial aliasing may be prevented by ensuring that $$\sqrt{k^2 + \left(\frac{D_{max}\ln 10}{20(z_h - z_s)}\right)^2} \leq 0.5 k_{sample}.$$

The maximum dynamical range or signal-to-noise ratio $D_{max}$=max{$D(x,y,z_h,\omega)$}, where the dynamical range for a single measurement point in a hologram is determined by $$D(x, y, z_h, \omega) = 20^{10}\log\left(\frac{M(x, y, z_h, \omega)}{E(x, y, z_h, \omega)}\right)$$

where $M(x,y,z_h,\omega)$ is the measured field amplitude and $E(x,y,z_h,\omega)$ the measured noise amplitude at a certain measurement point in a hologram. $E(x,y,z_h,\omega)$ can be determined by turning off the source of interest and then measure with the measurement system.

An at least partially automated spatial setup may be implemented as follows:

1. Place an object of interest in a clamping unit.
2. Outline the source plane parallel to the measurement or hologram plane.
3. Measure the distance between the measurement or hologram plane and the source plane.
4. Measure the dynamical range on all (or a statistically relevant selection) hologram positions.
5. Set the sampling wavenumber and thus the spatial sampling based on equation (60), where the left and right side of the inequality are equal for an optimal sampling without spatial aliasing.

Alternatively, the distance may be varied and the spatial sampling may be constant, using equation (60) as a constraint, for example, as long as spatial aliasing is avoided according to the above mentioned spatial aliasing inequality (equation (60)).

Usually the placing of the object in a clamping unit is performed by hand, although it may be automated by means of for example a robot in a production line. The remaining steps 2-5 above may be easily automated using the techniques set forth in this description.

Equidistant Scalable Array (Measurement Grid)

An aspect of the invention provides a flexible and fast scalable array that is highly suitable for stationary and non-stationary Near-field Acoustic Imaging methods that uses the FFT algorithm (Planar Near-field Acoustic Holography, for example), however other algorithms may be used as well. The array is equidistantly scalable by only moving one slider that affects the rest of the array in such a way that it is constantly equidistant.

Non-scalable sensor arrays are known in the art. The "Intelligent Data Acquisition System—Type 3561" available from Brüel & Kjaer (Naerum, Denmark) uses a modular frame that can only be extended with extra frames and does not allow easy scaling.

In the acoustic imaging practice array measurements for Planar Near-field Acoustic Holography (PNAH) may be performed by scanning the single points of the full array with a single sensor. This may limit the collection of measurable sound sources to stationary sources. Also, measurements may take a considerable amount of time (typically 0.5 to 2 hours), which is undesirable. A known upgrade of the system is to make use of a full array of microphones. However, existing full sensor arrays do not allow to set scalability and spatial resolution on the fly. Also, the acoustic signal processing for PNAH uses a 2-dimensional Fast Fourier Transform (FFT) algorithm, which may work especially well if the measurement array has an equidistant grid in both directions. An equidistant scalable array may facilitate the PNAH processing. Moreover, it allows easy measurements of both stationary and non-stationary sources and it allows to change the spatial resolution of the grid easily.

New developments in signal processing for PNAH and, in particular border-padding, make it possible to measure smaller total grid sizes compared to existing methods. Also, the use of smaller grids in combination with the FFT algorithm make it a very fast method that is eventually suitable for embedded, real-time processing of acoustic data (an acoustic camera).

The distance between sensors in an array determines the spatial sampling rates, which influences the resolution of the acoustic images (e.g. denser measurement arrays on close distance may result in a higher resolution). Depending on the size and level of detail desired for the object of interest a certain minimum array size and sensor distance is established.

From the signal processing point of view the FFT algorithm expects that the space between sensor positions is of equal length in both x- and y-direction (equidistant array). From a processing speed point of view the total amount of sensors in both x- and y-direction should be a power of two. This is because the FFT algorithm is fastest for a power of two length of the input; also it is almost as fast for input lengths with only small prime factors and several times as slow for input lengths that are prime or which have large prime factors. Accordingly, the array preferably is square and preferably has a power of two length in both directions, or has input lengths with only small prime factors. Border-padding, which artificially lengthens the measured grid, is a solution to this problem and makes it possible to use the FFT at full speed with an array that does not meet the FFT requirements. For example, an array of 10 by 8 sensors can be used and signal processing with border-padding extends this grid to 32 by 32 points, which is a power of two that can be processed at full speed by the FFT algorithm.

So the total size of the array can be chosen freely. Preferably, the inter-sensor distances are equal in both directions. Also, the full array should be easily scalable. An easily scalable array may be realized by making a number of crosses that are stiff connected at their crossing. On this crossing a sensor may be placed. The separate crosses are placed on top and under each other until they make a full array. The stiff crossings make up one diagonal of the array, from this it follows that all other, not stiff connected crossings make up the rest of the array. Now sliders may be placed with mounted sensors (microphones) on top of them on the crossings, in such a way that the horizontal frame element that crosses with the vertical frame element can slide through the slider independently.

Figure 8:
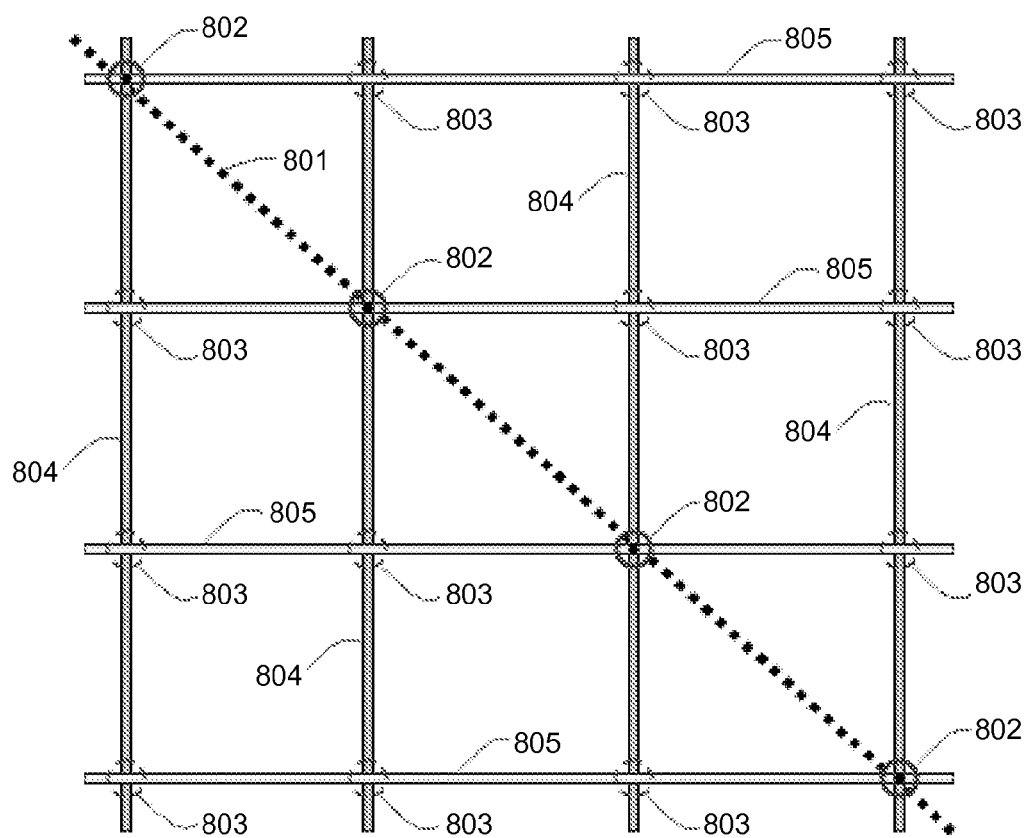
FIG. 8 illustrates a raster of an equidistant scalable array scaled at maximum scale.
Figure 9:
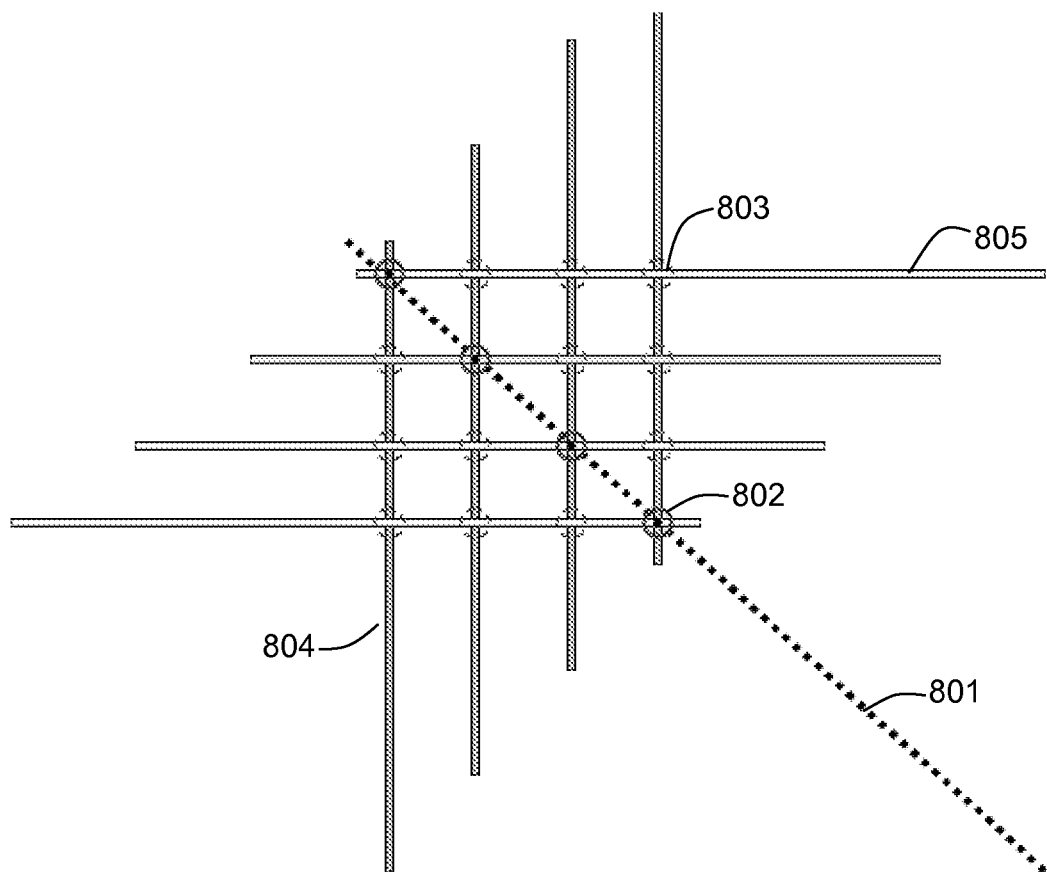
FIG. 9 illustrates a raster of an equidistant scalable array scaled at a close-to-minimum scale.

FIG. 8 shows a raster of an equidistant scalable array scaled at maximum scale. FIG. 9 shows the raster at a close-to-minimum scale. The figures show a diagonal sensor-slider 801, a crossing section on diagonal 802, an off-diagonal sensor-slider 803 where two frame elements are stiff connected, horizontal frame elements 805, and vertical frame elements 806. By sliding the stiff connected sensors on one diagonal of the array equidistantly, the other sensors will slide from or to each other with consistently making up an equidistant array. Preferably, the diagonal sliders may be moved in such a way that they keep equal distances between the separate points. The construction should be such that the angle between the diagonal slider 801 (see FIG. 10) and the vertical 804 and horizontal 805 frame elements is about 45°, it follows that the angle between 804 and 805 is about 90°. From this it follows that triangles with two angles of 45° and one of 90° are obtained, so the ratio between the long side (on the diagonal) and the two small sides will always be √2:1:1 given that the angles remain static. Since the sensors around the diagonal are all spaced equally, the other sensor positions 803 are preferably also equally spaced.

Figure 10:
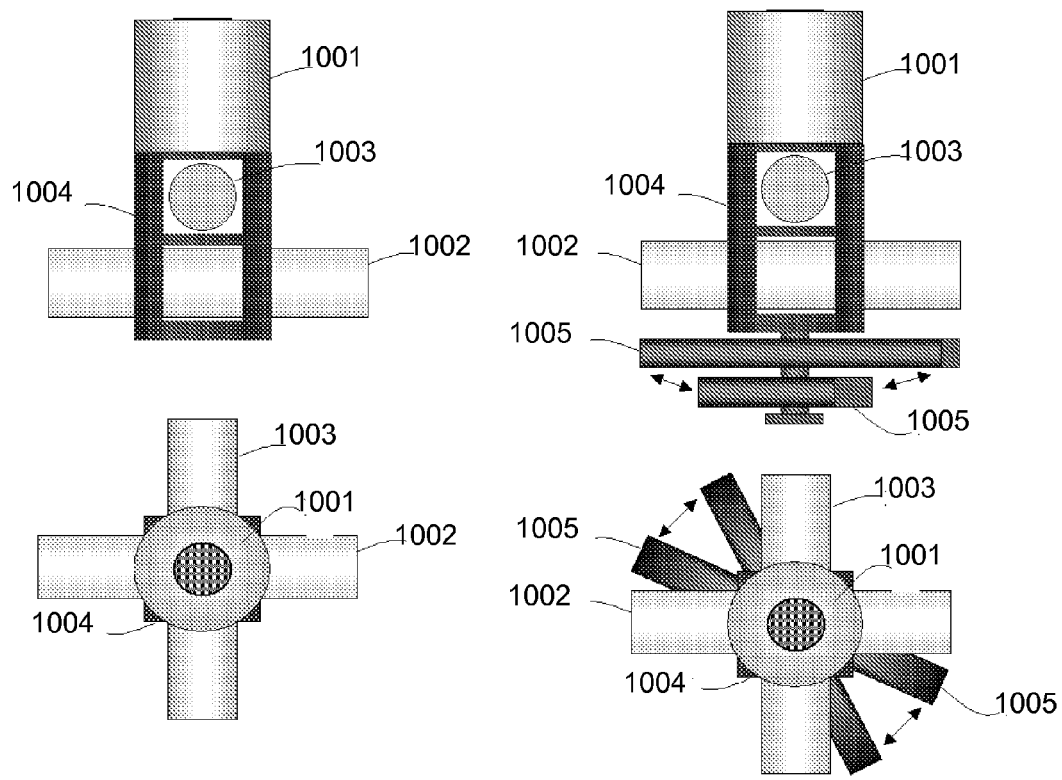
FIG. 10 illustrates a detail of an embodiment of an equidistant scalable array.

FIG. 10 illustrates a detail of an embodiment of the equidistant scalable array which is based upon the frame of FIG. 8 and FIG. 9. A possible design of the array sliders with mounted sensors is illustrated in FIG. 10. The figure shows cross sections with mounted sensor (microphone) where frame elements meet (at 804 and 805 in FIG. 8). The figure shows a small microphone 1001 (e.g. a Microtronic 8001/2), a horizontal frame element 1002, a vertical frame element 1003, and a slider 1004, and a scaling cross 1005. For the off-diagonal sensor sliders (1002 and 1003) the frame elements may slide through the slider 1004. When the wanted array size is met, the sliders are fixed. To this end fixation means are provided. The sensor sliders on the diagonal should be fixed on the crossing for the horizontal and vertical frame elements (1002 and 1003), but movable for the diagonal slider or hinge as illustrated in FIG. 11.

Figure 11:
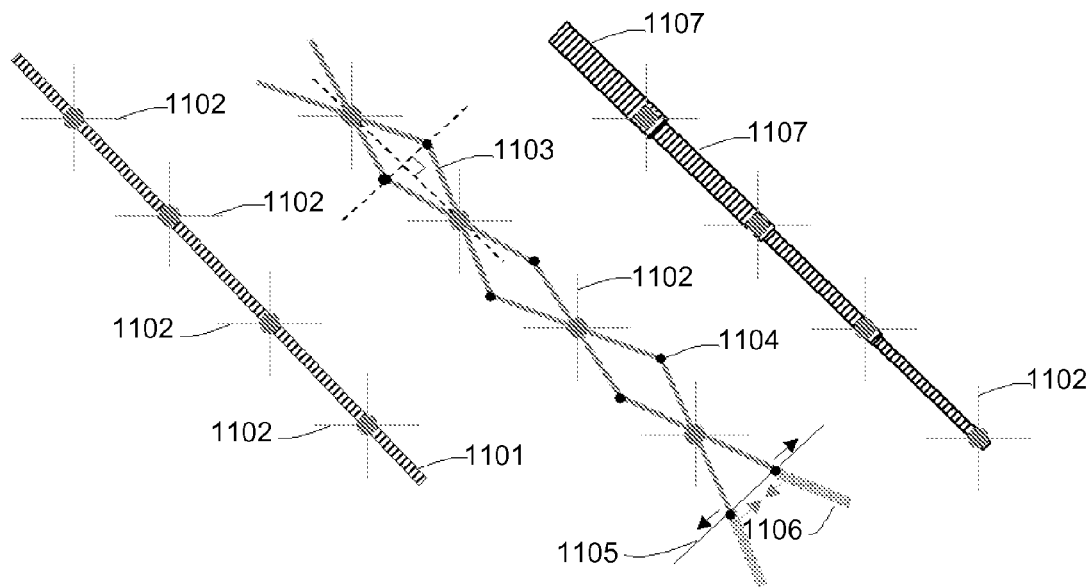
FIG. 11 illustrates three embodiments of a sensor slider.

FIG. 11 illustrates three embodiments of a diagonal sensor slider (mounted on the diagonal 801). Similar elements have been indicated with same reference numerals. The figure shows a diagonal slider with spatial scale 1101, a sensor/slider/frame combination 1102, a scaling cross 1103, a hinge 1104, a angle control slider 1105, a scaling cross grip 1106, and a telescope diagonal slider 1107. The leftmost embodiment shown in FIG. 11 comprises a simple form where the distances between the diagonal sensor elements 1102 can be put in the right spot with use of a scale. The middle embodiment is the fastest and nicest solution since only the grips 1106 are used to scale the full array without additional scaling independent elements. The slider near the grip makes sure the angle at the hinges is equal and thus creates equal distances between the sensor elements 1102. The rightmost embodiment uses a telescope 1107 to scale the diagonal; separate scaling of the diagonal elements may be provided.

Figure 12A:
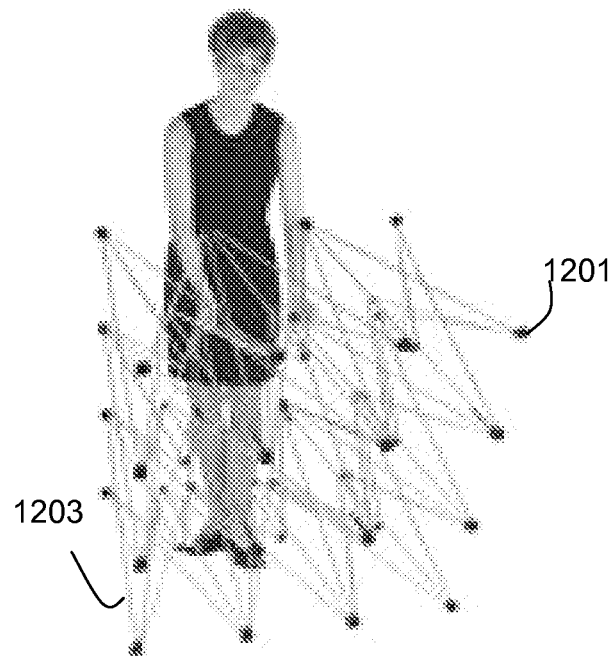
FIG. 12 illustrates another equidistant scalable array.
Figure 12B:
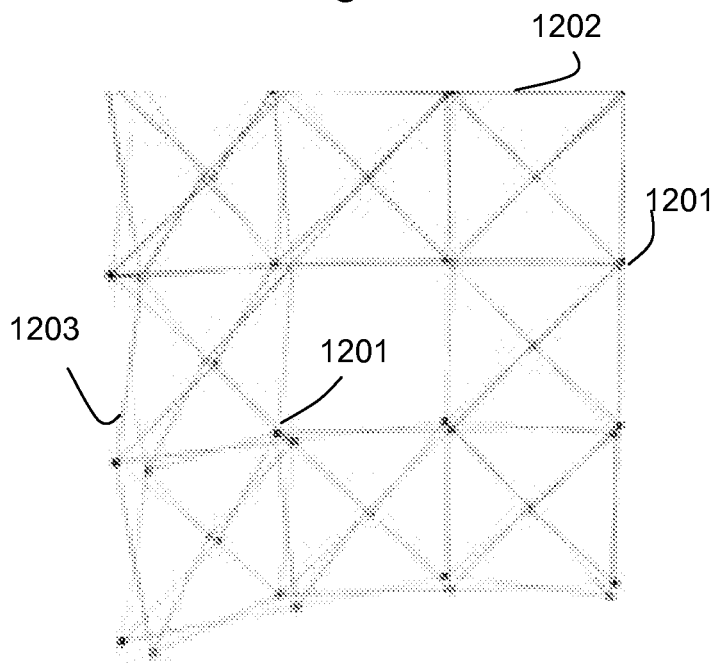

Another option for the scalable system is derived from the exposition walls used as a framework to present posters and company logos on. Such exposition walls are known in the field of advertising and conference equipment. The frame may be made out of lightweight metal beams 1202, 1203 that may be changed from a large wall into a very compact setting that is suitable for transportation. See FIG. 12 for an impression of this system when being folded (FIG. 12A) and in a near-unfolded situation (FIG. 12B). Acoustic sensors 1201 may be mounted on top of the most forward positions in the resulting matrix, thus forming an equidistant scalable microphone array suitable for FFT based NAH. Also, it may be suitable for double (or multi) plane array methods, since sensors can also be attached to the back of the array. Finally, the design may be carefully designed acoustically to minimize reflection of acoustic waves and thus disturb the field and eventually lower the quality of the acoustic imaging system.

Benefits of equidistant scalable arrays may include:
Large possible resolution range
Wide range of possible measurement areas
High flexibility
Equidistant grid for fast (real-time) PNAH processing with FFT
Effective and simple structure with minimal affection of acoustic properties.

Such equidistant scalable arrays may be used for quick and easy acoustic array measurements for Near-field Acoustic Imaging at multiple resolutions for both stationary and non-stationary sound sources. Also other array based sensor systems can profit from a similar construction.

A method of performing near-field acoustic holography may comprise establishing a minimal distance between a set of acoustic sensor positions and an acoustic source in dependence on a signal-to-noise ratio, a wavenumber of interest, and an inter-sensor distance, for avoiding spatial aliasing. The wavenumber of interest indicates a wavenumber produced by the acoustic source. To this end, the signal-to-noise ratio, the wavenumber, and the inter-sensor distance may be established before establishing the minimal distance. The method may further comprise recording acoustic signals with acoustic sensors provided at the acoustic sensor positions to obtain near-field holography data. These acoustic signals may be processed in one of the ways set forth. Indicating means may be provided for indicating to a user whether a distance between the acoustic sensors and the acoustic source is at least the minimal distance. Such indication means may function as a trigger for a user to decrease the distance between the acoustic sensors and the acoustic source if this distance is greater than the minimal distance for improving the measurement accuracy. Also, such indication means may function as a trigger for a user to increase the distance between the acoustic sensors and the acoustic source if this distance is smaller than the minimal distance, for avoiding aliasing. Such increasing or decreasing may also be performed automatically based on the indicator.

The minimal distance may be a distance satisfying $$\sqrt{k^2 + \left(\frac{D_{max}\ln 10}{20(z_h - z_s)}\right)^2} \leq 0.5 k_{sample},$$

wherein k is a wavenumber of interest, $(z_h - z_s)$ a distance between hologram and source, $k_{sample}$ is a sampling wavenumber based on an inter-sensor step-size, and $D_{max}$ is a maximum dynamical range over the hologram.

In particular, the minimal distance may be given by the equation $$\sqrt{k^2 + \left(\frac{D_{max}\ln 10}{20(z_h - z_s)}\right)^2} = 0.5 k_{sample}.$$

Figure 13:
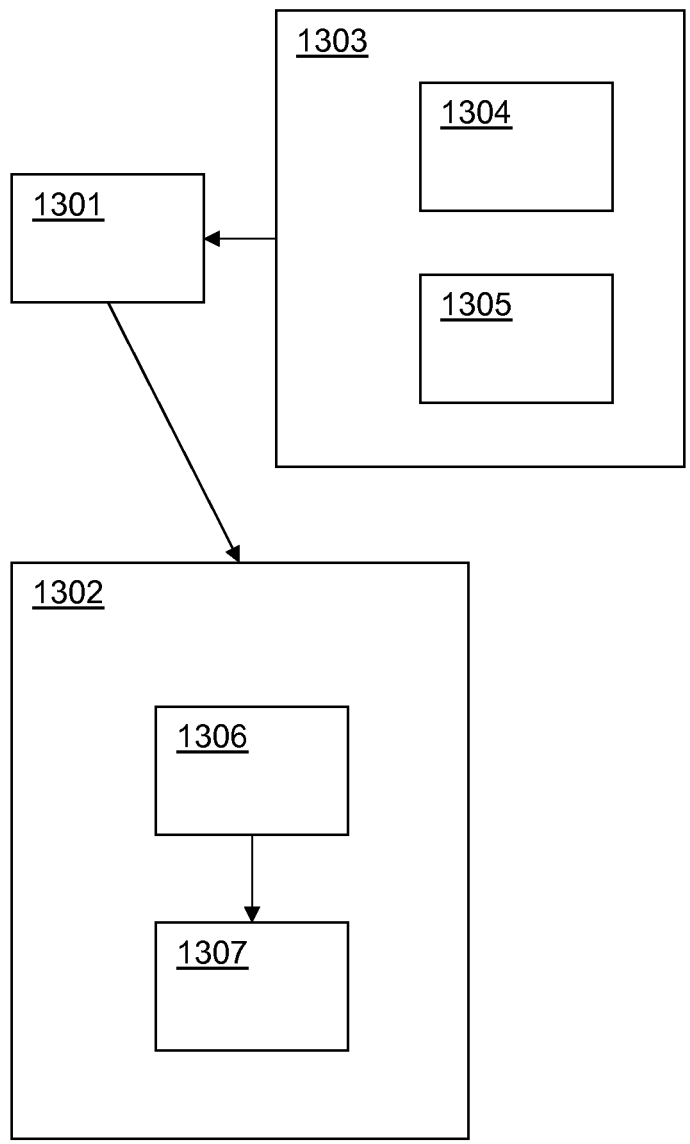
FIG. 13 illustrates a system for performing an acoustic holography measurement.

FIG. 13 illustrates a system for performing an acoustic holography measurement. The system may comprise an acoustic signal obtainer 1301. Such acoustic signal obtainer 1301 may be arranged for obtaining a first set of acoustic signals of an acoustic source using a first measurement configuration comprising a plurality of acoustic sensors at first positions with respect to the acoustic source. Moreover, the acoustic signal obtainer 1301 may be arranged for obtaining a second set of acoustic signals of the acoustic source using a second measurement configuration comprising a plurality of acoustic sensors at second positions with respect to the acoustic source. The system may further comprise a signal comparer 1302 for comparing the first set of acoustic signals with the second set of acoustic signals and for concluding whether spatial aliasing occurs in dependence on an outcome of the comparing. In case of spatial aliasing, patterns in the acoustic signals obtained using sensors at different positions vary in a way which can be detected by using pattern recognition technique.

The system may comprise a sensor positioning mechanism 1303 for adjusting a position of at least one of the acoustic sensors to obtain the plurality of acoustic sensors at the second positions. Such a sensor positioning mechanism 1303 may be arranged for adjusting a position of some or each of the acoustic sensors. This is an easy way to obtain the first and second set of signals. Moreover, the sensor positioning mechanism 1303 may be arranged for adjusting the position of the sensors to a position where spatial aliasing does not occur, for example by increasing the spacing or the distance to the acoustic source.

The sensor positioning mechanism 1303 may comprise a spacing mechanism 1304 for adjusting a spacing between the plurality of acoustic sensors at the first positions to obtain the plurality of acoustic sensors at the second positions. Such a spacing mechanism 1304 is an easy way to obtain the first and second measurement configurations. Moreover, the spacing mechanism 1304 may allow the system to avoid aliasing in a relatively simple way by adjusting the spacing. The system may be arranged for adjusting the spacing automatically. The system may be arranged for automatically adjusting the spacing to a smallest spacing at which aliasing does not occur.

The sensor positioning mechanism 1303 may comprise a distance adjusting mechanism 1305 for adjusting a distance between the plurality of sensors at the first positions and the acoustic source to obtain the plurality of acoustic sensors at the second positions. Such a mechanism is illustrated in FIG. 8, for example. This is another way to obtain the first and second measurement configurations and/or to avoid aliasing. The system may be arranged for automatically adjusting the distance. The system may be arranged for automatically adjusting the distance to a smallest distance at which aliasing does not occur. The spacing mechanism 1304 and the distance adjusting mechanism 1305 may be combined in a single embodiment to adjust both the spacing and the distance.

The first and second measurement configurations may be integrated as a single measurement configuration comprising a first layer of acoustic sensors at the first positions and a second layer of acoustic sensors at the second positions. The second layer may be more distant from the acoustic source than the first layer. Such a configuration is illustrated in FIG. 6, for example, with layers 606 and 607 of acoustic sensors.

The signal comparer 1302 may comprise a transformer 1306 for applying a spatial frequency transform to the first set of acoustic signals to obtain first transformed data and for applying a spatial frequency transform to the second set of acoustic signals to obtain second transformed data. This way, the spatial frequency transforms of the signals can be compared to establish whether spatial aliasing has occurred. The signal comparer 1302 may further comprise a peak comparer 1307 for comparing a peak in the first transformed data and in the second transformed data. A shift in a peak between the two frequency transformed datasets may indicate aliasing.

A method of performing an acoustic holography measurement may comprise obtaining a first set of acoustic signals of an acoustic source using a first measurement configuration comprising a plurality of acoustic sensors at first positions with respect to the acoustic source;

obtaining a second set of acoustic signals of the acoustic source using a second measurement configuration comprising a plurality of acoustic sensors at second positions with respect to the acoustic source;

comparing the first set of acoustic signals with the second set of acoustic signals; and concluding whether spatial aliasing occurs in dependence on an outcome of the comparing.

A measurement configuration for performing near-field acoustic holography measurement may comprise a plurality of acoustic sensors positioned on a grid. The measurement configuration may further comprise a mechanism for linearly scaling the grid by adjusting an inter-sensor spacing of the acoustic sensors. Such mechanism allows to adjust the inter-sensor spacing to an optimal spacing relatively easily. The measurement configuration may be a scalable array, wherein the inter-sensor distances are equal in both directions. However, another kind of grid is also possible. For example, a pentagonal grid can be used.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program, such as a computer readable medium. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of performing near-field acoustic holography, comprising:
   establishing acoustic data representing a set of near-field acoustic holography measurements at a first set of positions covering an aperture;
   extrapolating the acoustic data using model-based extrapolation to obtain extrapolated acoustic data relating to a plurality of positions outside the aperture; and
   applying a spatial frequency transform to the extrapolated acoustic data.

2. The method according to claim 1, further comprising:
   propagating the acoustic data in a spatial frequency domain towards a second set of positions different from the first set of positions to obtain propagated data corresponding to the second set of positions; and
   performing an inverse spatial frequency transform to the propagated data to obtain reconstructed acoustic data representing an acoustic signal at the second set of positions.

3. The method according to claim 1, further comprising applying an anti-leakage window to the extrapolated acoustic data, wherein the acoustic data covered by the aperture remains substantially unaltered, before performing the step of applying the spatial frequency transform.

4. The method according to claim 1, wherein the step of extrapolating comprises one of:
   maintaining a continuous first derivative at a boundary of the aperture;
   using linear predictive extrapolation; and
   extrapolating a plurality of the measurements in a first extrapolation direction and in a direction opposite to the first extrapolation direction to obtain first extrapolated values, and extrapolating the measurements and the first extrapolated values in a second extrapolation direction to obtain second extrapolation values, the extrapolated acoustic data comprising 2D extrapolated data representing values from both the first extrapolated values and the second extrapolated values.

5. The method according to claim 1, further comprising applying a regularization by:
   establishing at least a cut-off and a slope of a low-pass filter in dependence on a quality measure of acoustic data processed by the low-pass filter with the cut-off and the slope; and
   applying the low-pass filter using the cut-off and the slope to obtain regularized data.

6. The method according to claim 1, further comprising
   establishing a propagating wavenumber range in which propagating waves occur, and an evanescent wavenumber range in which evanescent waves occur; and
   using for a regularization a low-pass filter which passes substantially all of the propagating wavenumber range and which attenuates part of the evanescent wavenumber range.

7. The method according to claim 6, wherein the low-pass filter comprises an all-pass range, which includes the propagating wavenumber range, an all-stop range, which comprises part of the evanescent wavenumber range, and a tapered range between the all-pass range and the all-stop range, the tapered range comprising part of the evanescent wavenumber range.

8. The method according to claim 1, comprising establishing a minimal distance between a set of acoustic sensor positions and an acoustic source in dependence on a signal-to-noise ratio, a wavenumber of interest, and an inter-sensor distance, for avoiding spatial aliasing.

9. The method according to claim 8, further comprising
   providing acoustic sensors at the acoustic sensor positions; and
   indicating to a user whether a distance between the acoustic sensors and the acoustic source is at least the minimal distance.

10. A computer program product comprising machine readable instructions stored on a non-transitory computer readable medium for causing a processor system to perform the method according to claim 1.

11. A system for performing near-field acoustic holography, comprising:
    an input for establishing acoustic data representing a set of near-field acoustic holography measurements at a first set of positions covering an aperture;
    an extrapolator for extrapolating the acoustic data using model-based extrapolation to obtain extrapolated acoustic data relating to a plurality of positions outside the aperture; and
    a spatial frequency transformer for applying a spatial frequency transform to the extrapolated acoustic data.

12. The system according to claim 11, further comprising
    a clamping unit for holding an object comprising a sound source; and
    a plurality of acoustic sensors at the first set of positions for providing a plurality of acoustic signals to the input.

13. The system according to claim 11, further comprising
    a distance detector for detecting a distance to at least part of an object;
    a measurement plane selector for establishing a measurement plane in dependence on the distance; and
    a sensor positioner for positioning an acoustic sensor on the measurement plane.

14. A system for performing an acoustic holography measurement, comprising
    an acoustic signal obtainer for obtaining a first set of acoustic signals of an acoustic source using a first measurement configuration comprising a plurality of acoustic sensors at first positions with respect to the acoustic source, and for obtaining a second set of acoustic signals of the acoustic source using a second measurement configuration comprising a plurality of acoustic sensors at second positions with respect to the acoustic source; and
    a signal comparer for comparing the first set of acoustic signals with the second set of acoustic signals and for concluding whether spatial aliasing occurs in dependence on an outcome of the comparing.

15. The system according to claim 14, further comprising a sensor positioning mechanism for adjusting a position of at least one of the acoustic sensors to obtain the plurality of acoustic sensors at the second positions.

16. The system according to claim 15, the sensor positioning mechanism comprising a spacing mechanism for adjusting a spacing between the plurality of acoustic sensors at the first positions to obtain the plurality of acoustic sensors at the second positions.

17. The system according to claim 15, the sensor positioning mechanism comprising a distance adjusting mechanism for adjusting a distance between the plurality of sensors at the first positions and the acoustic source to obtain the plurality of acoustic sensors at the second positions.

18. The system according to claim 14, the first and second measurement configurations being integrated as a single measurement configuration comprising a first layer of acoustic sensors at the first positions and a second layer of acoustic sensors at the second positions, the second layer being more distant from the acoustic source than the first layer.

19. The system according claim 14, the signal comparer comprising:
   a transformer for applying a spatial frequency transform to the first set of acoustic signals to obtain first transformed data and for applying a spatial frequency transform to the second set of acoustic signals to obtain second transformed data; and
   a peak comparer for comparing a peak in the first transformed data and in the second transformed data.

20. The system according to claim 14, comprising a measurement configuration comprising
   a plurality of acoustic sensors positioned on a grid; and
   a mechanism for linearly scaling the grid by adjusting an inter-sensor spacing of the acoustic sensors.

21. The measurement configuration of claim 20, the measurement configuration comprising a scalable array, wherein the inter-sensor distances are equal in both directions.

22. A method of performing an acoustic holography measurement, comprising
   obtaining a first set of acoustic signals of an acoustic source using a first measurement configuration comprising a plurality of acoustic sensors at first positions with respect to the acoustic source;
   obtaining a second set of acoustic signals of the acoustic source using a second measurement configuration comprising a plurality of acoustic sensors at second positions with respect to the acoustic source;
   comparing the first set of acoustic signals with the second set of acoustic signals;
   concluding whether spatial aliasing occurs in dependence on an outcome of the comparing.

* * * * *